United States Patent
Takahira

(10) Patent No.: US 9,535,634 B2
(45) Date of Patent: Jan. 3, 2017

(54) INFORMATION PROCESSING APPARATUS, IMAGE PROCESSING APPARATUS, INFORMATION PROCESSING SYSTEM AND INFORMATION PROCESSING METHOD

(71) Applicant: Tomoyuki Takahira, Kanagawa (JP)

(72) Inventor: Tomoyuki Takahira, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/839,548

(22) Filed: Aug. 28, 2015

(65) Prior Publication Data
US 2016/0070509 A1 Mar. 10, 2016

(30) Foreign Application Priority Data

Sep. 5, 2014 (JP) .................................. 2014-180812
Jul. 27, 2015 (JP) .................................. 2015-147466

(51) Int. Cl.
*G06F 3/12* (2006.01)
*H04N 1/00* (2006.01)

(52) U.S. Cl.
CPC ........... *G06F 3/1204* (2013.01); *G06F 3/1257* (2013.01); *G06F 3/1292* (2013.01); *H04N 1/00244* (2013.01); *H04N 1/00307* (2013.01); *H04N 1/00395* (2013.01); *H04N 2201/0094* (2013.01); *H04N 2201/3205* (2013.01); *H04N 2201/3236* (2013.01); *H04N 2201/3246* (2013.01); *H04N 2201/3277* (2013.01)

(58) Field of Classification Search
None
See application file for complete search history.

(56) References Cited

U.S. PATENT DOCUMENTS

| | | | |
|---|---|---|---|
| 2007/0216935 A1* | 9/2007 | Osamura | G06F 3/1222 358/1.15 |
| 2011/0216347 A1* | 9/2011 | Kikuchi | G06K 15/02 358/1.14 |
| 2013/0208299 A1* | 8/2013 | Doui | G06K 15/4095 358/1.14 |

FOREIGN PATENT DOCUMENTS

| | | |
|---|---|---|
| JP | 2001-285957 | 10/2001 |
| JP | 2007-019622 | 1/2007 |
| JP | 4765621 | 9/2011 |
| JP | 5304361 | 10/2013 |

* cited by examiner

*Primary Examiner* — Andrew H Lam
(74) *Attorney, Agent, or Firm* — Harness, Dickey & Pierce, P.L.C.

(57) ABSTRACT

An information processing apparatus accumulates one or more jobs sent from a terminal device connected via a network. The information processing apparatus includes an acquisition unit configured to acquire user information for identifying a user who logs in on the terminal device and first identification information for identifying the terminal device; a determination unit configured to determine whether the first identification information corresponds to second identification information for identifying the terminal device which sends a job including the user information, the second identification information being included in the job; and an execution unit configured to execute the job to perform a predetermined process in a case where the determination unit determines that the first identification information corresponds to the second identification information.

15 Claims, 22 Drawing Sheets

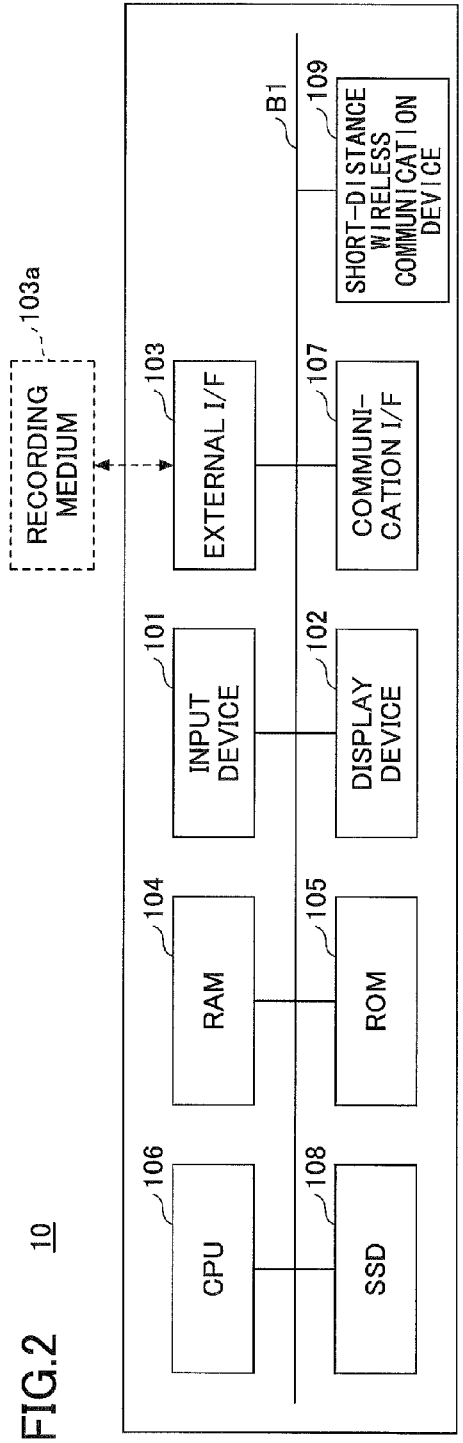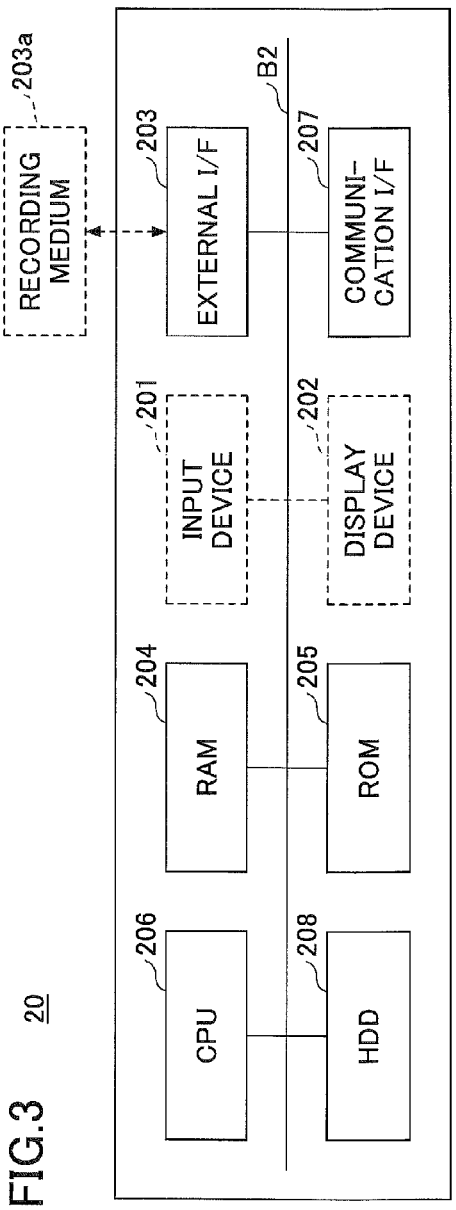

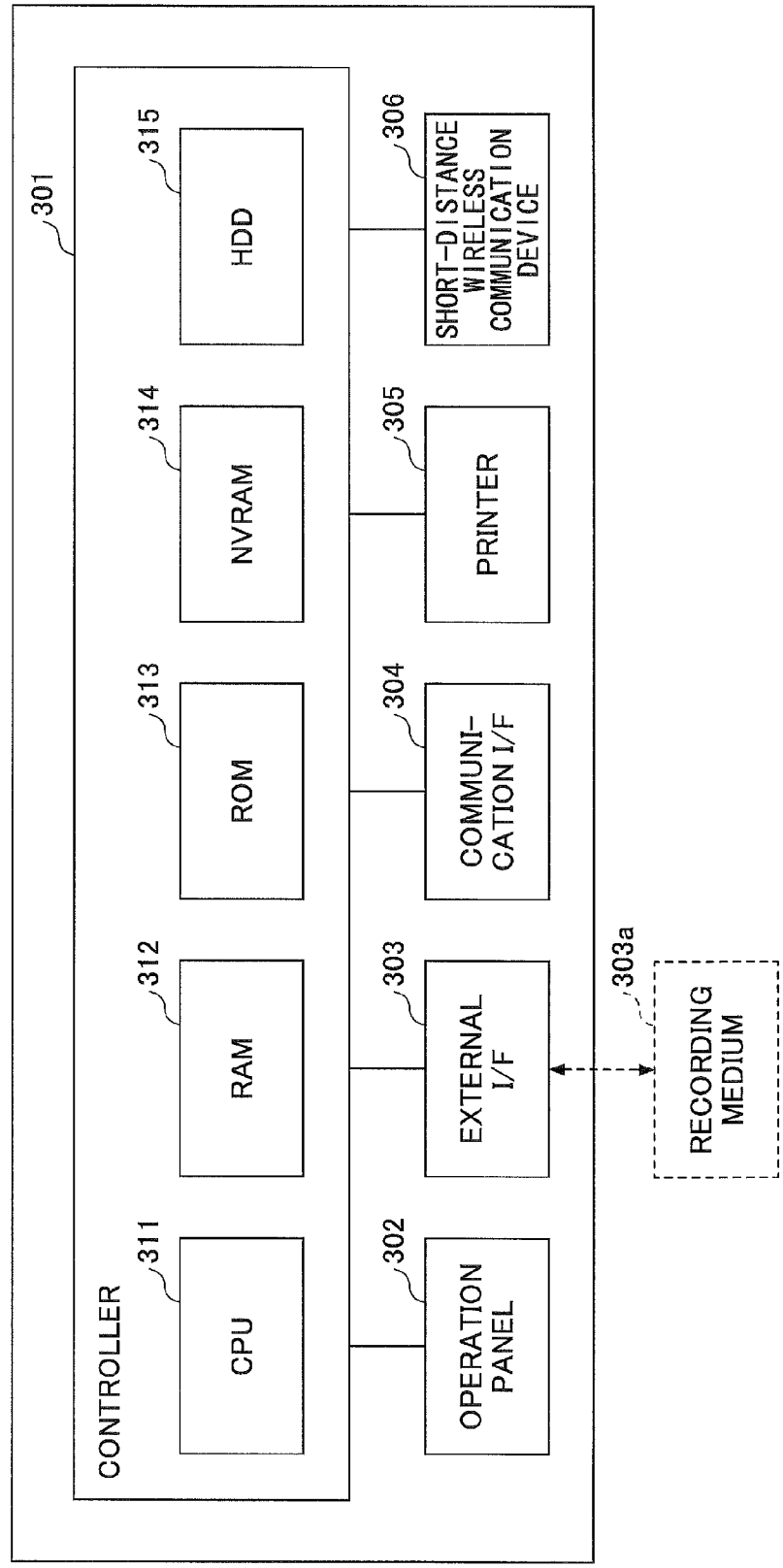

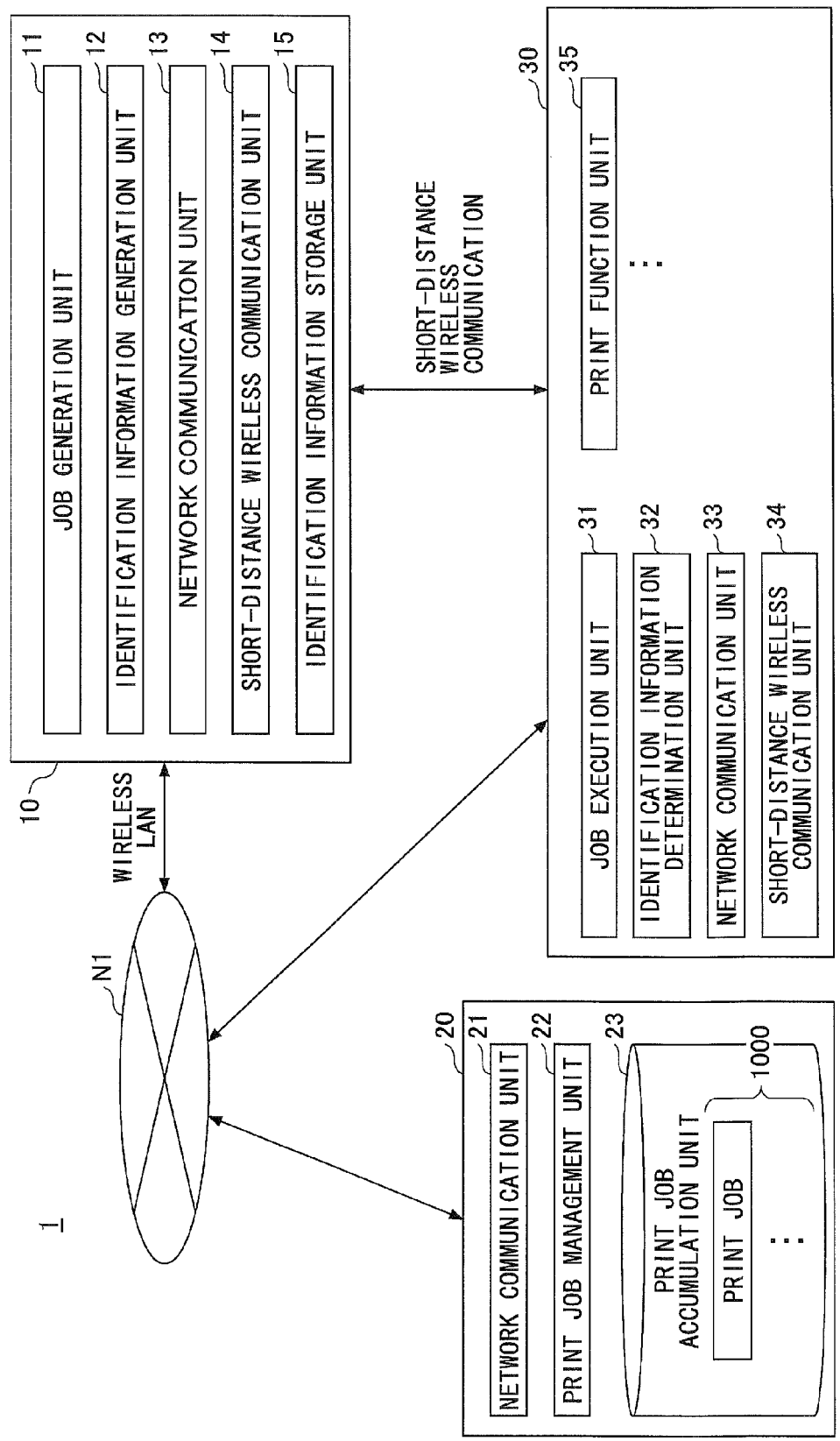

FIG.6

| JOB ID | USER ID | IDENTIFICATION INFORMATION | PRINT TARGET DATA |
|---|---|---|---|
| 0001 | user_A | xxxabc | document_A.pdf |
| 0002 | user_B | xyz123 | document_B.pdf |
| 0003 | user_A |  | document_C.pdf |
| ⋮ | | | |

1000

| USER ID | IDENTIFICATION INFORMATION |
|---|---|
| user_A | xxxabc |
| user_A | xxx123 |
| user_B | xyz123 |
| user_C | abcxyz |
| ⋮ | |

INFORMATION PROCESSING APPARATUS, IMAGE PROCESSING APPARATUS, INFORMATION PROCESSING SYSTEM AND INFORMATION PROCESSING METHOD

BACKGROUND OF THE INVENTION

1. Field of the Invention

The disclosures herein generally relate to an information processing apparatus, an image processing apparatus, an information processing system and an information processing method.

2. Description of the Related Art

Conventionally, there is known a technique by which authentication is performed by using a card for authentication, such as an IC (Integrated Circuit) card, upon using various functions such as printing, scanning or facsimile at an image forming apparatus such as an MFP (Multi-Function Peripheral).

On the other hand, there is known a technique for preventing leakage of authentication information upon using an image forming apparatus such as an MFP (for example, see Japanese Patent No. 4765621). Moreover, there is known a technique for performing authentication without using a card for authentication by using a calling number of a mobile phone or the like (for example, see Japanese Published Patent Application No. 2001-285957).

However, in the related art described in Japanese Patent No. 4765621, although leakage of authentication information can be prevented, a user has to have the card for authentication in order to use the image forming apparatus such as an MFP, and it is inconvenient for the user. On the other hand, in the related art described in Japanese Published Patent Application No. 2001-285957, although the card for authentication becomes unnecessary by using the calling number of the mobile phone or the like, there is a problem that the calling number is easy to be leaked, disguised or spoofed.

SUMMARY OF THE INVENTION

It is a general object of at least one embodiment of the present invention to provide an information processing apparatus, an image forming apparatus, an information processing system and an information processing method that substantially obviate one or more problems caused by the limitations and disadvantages of the related art.

In one embodiment, an information processing apparatus accumulates one or more jobs sent from a terminal device connected via a network. The information processing apparatus includes an acquisition unit configured to acquire user information for identifying a user who logs in on the terminal device and first identification information for identifying the terminal device; a determination unit configured to determine whether the first identification information corresponds to second identification information for identifying the terminal device which sends a job including the user information, the second identification information being included in the job; and an execution unit configured to execute the job to perform a predetermined process in a case where the determination unit determines that the first identification information corresponds to the second identification information.

In another embodiment, an image processing apparatus accumulates one or more jobs sent from a terminal device connected via a network. The image processing apparatus includes an acquisition unit configured to acquire user information for identifying a user who logs in on the terminal device and first identification information for identifying the terminal device; a determination unit configured to determine whether the first identification information corresponds to second identification information for identifying the terminal device which sends a job including the user information, the second identification information being included in the job; and an execution unit configured to execute the job to perform a predetermined image process in a case where the determination unit determines that the first identification information corresponds to the second identification information.

In yet another embodiment, an information processing system includes an information processing apparatus that accumulates one or more jobs sent from a terminal device connected via a network and an image processing apparatus that performs a predetermined image process in accordance with the job. The information processing apparatus includes an acquisition unit configured to acquire user information for identifying a user who logs in on the terminal device and first identification information for identifying the terminal device; a determination unit configured to determine whether the first identification information corresponds to second identification information for identifying the terminal device which sends a job including the user information, the second identification information being included in the job; and an execution unit configured to execute the job to perform the predetermined image process in a case where the determination unit determines that the first identification information corresponds to the second identification information.

In yet another embodiment, an information processing method is executed in an information processing apparatus that accumulates one or more jobs sent from a terminal device connected via a network. The method includes acquiring user information for identifying a user who logs in on the terminal device and first identification information for identifying the terminal device; determining whether the first identification information corresponds to second identification information for identifying the terminal device which sends a job including the user information, the second identification information being included in the job; and executing the job to perform a predetermined process in a case where it is determined that the first identification information corresponds to the second identification information.

According to the embodiments of the present application, improvement of convenience upon using an information processing system from a terminal can be supported.

BRIEF DESCRIPTION OF THE DRAWINGS

Other objects and further features of embodiments will become apparent from the following detailed description when read in conjunction with the accompanying drawings, in which:

FIG. 2 is a diagram illustrating an example of a hardware configuration of a mobile terminal according to the first embodiment;

FIG. 3 is a diagram illustrating an example of a hardware configuration of a print server according to the first embodiment;

FIG. 4 is a diagram illustrating an example of a hardware configuration of an image forming apparatus according to the first embodiment;

FIG. 5 is a functional block diagram illustrating an example of the print system according to the first embodiment;

FIG. 6 is a diagram for explaining a design of an example of a print job table according to the first embodiment;

DESCRIPTION OF THE PREFERRED EMBODIMENTS

In the following, embodiments of the present invention will be described in detail with reference to the accompanying drawings.

First Embodiment

System Configuration

Figure 1:
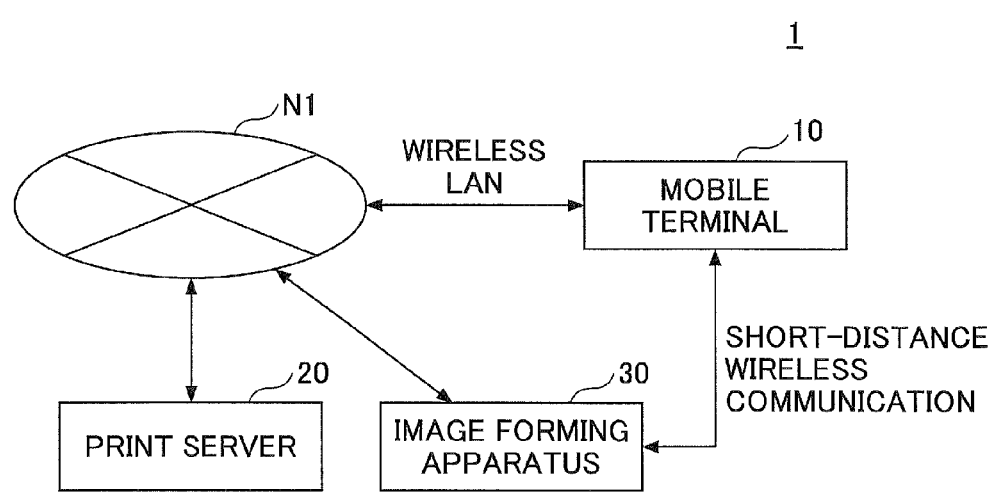
FIG. 1 is a diagram illustrating an example of a configuration of a print system according to a first embodiment.

First, a system configuration of a print system 1 according to the present embodiment will be explained with reference to FIG. 1. FIG. 1 is a diagram illustrating an example of a configuration of the print system 1 according to a first embodiment. In the print system 1 shown in FIG. 1, a mobile terminal 10, a print server 20, and one or more image forming apparatuses 30 are connected to a network N1 such as a LAN (Local Area Network), by wire or wirelessly. Especially, the mobile terminal 10 is assumed to be connected to the network N1 wirelessly.

The mobile terminal 10 is a terminal device, such as a smart phone that a user operates. The mobile terminal may be a mobile phone, a tablet type terminal, a gaming machine, a PDA (Personal Digital Assistant), a digital camera or the like. In the mobile terminal 10, application software (print application) that can perform print instructions for print target data is installed. The mobile terminal 10 generates a print job including the print target data related to the print instructions, and sends the print job to the print server 20.

Moreover, the mobile terminal 10 is provided with a short-distance wireless communication device, such as an NFC (Near Field Communication) chip, which will be described later, and can perform printing for the print target data at the image forming apparatus 30 by holding the mobile terminal 10 over a predetermined position of the image forming apparatus 30.

Meanwhile, the print application refers to a software application that can perform print instructions for print target data, such as a browser, word-processing software, or a viewer.

The print server 20 is an information processing apparatus that accumulates a print job sent from the mobile terminal 10. Moreover, the print server 20, in response to a request from the image forming apparatus 30, sends the print job related to the request to the image forming apparatus 30.

The image forming apparatus 30 is an image processing apparatus, such as a printer, that receives, in response to a request from the mobile terminal 10, a print job from the print server 20, and performs printing for print target data. Meanwhile, the image forming apparatus 30 may be a composite machine, such as an MFP, that has plural functions such as copying function, a scanning function, and a facsimile function in addition to the printing function.

Moreover, the image forming apparatus 30 may be, for example, an output apparatus, such as a projector, an electronic blackboard or digital signage, or a sound output apparatus, such as a speaker device. That is, in the present embodiment, a case of a print system will be explained as an example of an information processing system, but it is not limited to this. The present embodiment may be, for example, an image output system using an image output apparatus such as a projector instead of the image forming apparatus, or a sound output system using a speaker device instead of the image forming apparatus 30. That is to say, the embodiment of the present invention can be applied to various systems using apparatuses that execute predetermined jobs in response to a request from the mobile terminal 10.

Meanwhile, in the print system 1, which is explained above, the configuration including the print server 20 is explained. However, it is not limited to this, and it may be a configuration in which the image forming apparatus 30 accumulates a print job. That is, the print server 20 and the image forming apparatus 30 may be configured with an information processing apparatus. Moreover, it may be a configuration in which two or more mobile terminals 10 and two or more image forming apparatuses 30 are included.

<Hardware Configuration>
<<Mobile Terminal>>

The mobile terminal 10 according to the present embodiment is realized by a hardware configuration as shown in FIG. 2, for example. FIG. 2 is a hardware configuration diagram of an example of the mobile terminal according to the first embodiment. The mobile terminal 10 shown in FIG. 2 includes an input device 101, a display device 102, an external I/F 103, a RAM (Random Access Memory) 104 and a ROM (Read-Only Memory) 105. Moreover, the mobile terminal 10 shown in FIG. 2 further includes a CPU (Central Processing Unit) 106, a communication I/F 107, an SSD (Solid State Drive) 108, a short-distance wireless communication device 109, and the like. The above-described hardware components are connected to each other via a bus B1.

The input device 101 is, for example, a touch panel, and used for inputting respective operation signals to the mobile terminal 10. Meanwhile, the input device 101 may be a keyboard, a mouse or the like. The display device 102 is, for example, an LCD (Liquid Crystal Display) or the like, and displays results of processing by the mobile terminal 10.

The external I/F 103 is an interface to an external device. The external device includes, for example, a recording medium 103a. The recording medium 103a can store a program that realizes the embodiment. The mobile terminal 10 can read out from and/or write into the recording medium 103a via the external I/F 103.

The recording medium 103a is, for example, a recording medium such as an SD memory card. The recording medium 103a may be a recording medium such as a USB (Universal Serial Bus) memory, a DVD (Digital Versatile Disk), a CD (Compact Disk) or a flexible disk.

The RAM 104 is a volatile semiconductor memory (storage device) temporarily retaining a program or data. The ROM 105 is a non-volatile semiconductor memory (storage device) that can maintain a program or data even when power is turned off. In the ROM 105, programs or data, such as a BIOS (Basic Input/Output System) which is executed upon the mobile terminal 10 being activated, OS configurations and network configurations, are stored.

The CPU 106 is an arithmetic device that executes control of the overall mobile terminal 10 or functions by reading out a program or data on the RAM 104 from a storage device such as the ROM 105 or the SSD 108 and executing processes.

The communication I/F 107 is an interface for connecting the mobile terminal 10 to a mobile telephone network, the Internet, the network N1 or the like. According to this configuration, the mobile terminal 10 can perform data communication via the communication I/F 107.

The SSD 108 is a non-volatile storage device storing a program or data. The program or data stored in the SSD 108 include, for example, an OS (Operating System) that is basic software for controlling the overall mobile terminal 10 or application software that provides various functions on the OS. The SSD 108 manages the stored program or data by a predetermined file system and/or a database (DB).

Meanwhile, the mobile terminal 10 may be provided with an HDD (Hard Disk Drive), a flash memory or the like instead or the SSD 108 or along with the SSD 108.

The short-distance wireless communication device 109 is, for example, an NFC chip. According to the above-described configuration, the mobile terminal 10 can perform data communication via the short-distance wireless communication device 109. Meanwhile, the short-distance wireless communication device 109 is not limited to the NFC chip, but may be, for example, a BLE (Bluetooth Low Energy) chip. According to this configuration, the mobile terminal 10 can perform data communication with the image forming apparatus 30 by the BLE chip.

The mobile terminal 10 according to the present embodiment can realize various processes, which will be described later, according to the above-described hardware configuration.

<<Print Server>>

The print server 20 according to the present embodiment is realized by a hardware configuration as shown in FIG. 3, for example. FIG. 3 is a hardware configuration diagram of an example of the print server according to the first embodiment. The print server 20 shown in FIG. 3 includes an input device 201, a display device 202, an external I/F 203, an RAM 204, a ROM 205, a CPU 206, a communication I/F 207 and an HDD 208. The above-described hardware components are connected to each other via the a B2.

The input device 201 includes a keyboard, a mouse, a touch panel or the like, and is used for inputting respective operation signals to the print server 20. The display device 202 includes an LCD, a CRT (Cathode Ray Tube) or the like, and displays a result of processing by the print server 20. Meanwhile, it may be in the form of using the input device 201 and/or the display device 202, which are connected to the bus B2 when necessary.

The external I/F 203 is an interface to an external device. The external device includes, for example, a recording medium 203a. The recording medium 203a can store a program that realizes the embodiment. The print server 20 can read out from and/or write into the recording medium 203a via the external I/F 203. As the recording medium 203a, a recording medium such as a USB memory, an SD memory card, a DVD, a CD, a flexible disk or the like may be used.

The RAM 204 is a volatile semiconductor memory (storage device) temporarily retaining a program or data. The ROM 205 is a non-volatile semiconductor memory (storage device) that can maintain a program or data even when power is turned off. In the ROM 205, programs or data, such as a BIOS which is executed upon the print server 20 being activated, OS configurations and network configurations, are stored.

The CPU 206 is an arithmetic device that executes control of the overall print server 20 or functions by reading out a program or data on the RAM 204 from a storage device such as the ROM 205 or the HDD 208 and executing processes.

The communication I/F 207 is an interface for connecting to the network N1. According to this configuration, the print server 20 can perform data communication via the communication I/F 207. Meanwhile, a communication by the communication I/F 207 may be a wired communication or may be a wireless communication.

The HDD 208 is a non-volatile storage device storing a program or data. The program or data stored in the HDD 208 include, for example, an OS which is basic software for controlling the overall print server 20 or application software that provides various functions on the OS. The HDD 208 manages the stored program or data by a predetermine file system and/or a database (DB).

The print server 20 according to the present embodiment can realize various processes, which will be described later, according to the above-described hardware configuration.

<<Image Forming Apparatus>>

The image forming apparatus 30 according to the present embodiment is realized by a hardware configuration as shown in FIG. 4, for example. FIG. 4 is a hardware configuration diagram of an example of the image forming apparatus according to the first embodiment. The image forming apparatus 30 shown in FIG. 4 includes a controller 301, an operation panel 302, an external I/F 303, a communication I/F 304, a printer 305, a short-distance wireless communication device 306 and the like.

The controller 301 includes a CPU 311, a RAM 312, a ROM 313, an NVRAM (Non-Volatile RAM) 314 and an HDD 315. The ROM 313 stores various programs and data. The RAM 312 temporarily retains a program or data. The NVRAM 314 stores configuration information, for example. Moreover, the HDD 315 stores various programs or data.

The CPU 311 realizes control of the overall image forming apparatus 30 or functions by reading out a program, data, configuration information or the like onto the RAM 312 from the ROM 313, the NVRAM 314, the HDD 315 or the like and executing processes.

The operation panel 302 is provided with an input unit for receiving an input from a user, and a display unit for performing display. The external I/F 303 is an interface to an external device. The external device includes a recording medium 303a or the like. According to the above-described configuration, the image forming apparatus 30 can read out from and/or write into the recording medium 303a via the external I/F 303. The recording medium 303a includes a flexible disk, a CD, a DVD, an SD memory card, a USB memory or the like.

The communication I/F 304 is an interface for connecting the image forming apparatus 30 to the network N1. According to this configuration, the image forming apparatus 30 can perform data communication via the communication I/F 304. The printer 305 is a printing device for printing print target data and outputting.

The short-distance wireless communication device 306 is, for example, an NFC chip. According to this configuration, the image forming apparatus 30 can perform data communication via the short-distance wireless communication device 306. Meanwhile, the short-distance wireless communication device 306 may be located outside the image forming apparatus 30, not inside the image forming apparatus 30. For example, the NFC chip may be adhered to the image forming apparatus 30 at a predetermined position. In this case, the NFC chip is preferably adhered at a position where it is easy to perform short-distance communication with the mobile terminal 10.

Moreover, the short-distance wireless communication device 306 is not limited to the NFC chip, and may be a BLE chip or the like. According to this configuration, the image forming apparatus 30 can perform data communication with the mobile terminal 10 by BLE.

The image forming apparatus 30 according to the present embodiment can realize various processes, which will be described later, according to the above-described hardware configuration.

<Software Configuration>

The print system 1 according to the present embodiment can be expressed by a functional block diagram as shown in FIG. 5, for example. FIG. 5 is a functional block diagram of an example of the print system according to the first embodiment.

<<Mobile Terminal>>

The mobile terminal 10 includes a job generation unit 11, an identification information generation unit 12, a network communication unit 13, a short-distance wireless communication unit 14, an identification information storage unit 15 and the like.

The job generation unit 11 is realized by the CPU 106 or the like. In a case where print target data are selected by a user via a print application or the like, the job generation unit 11 generates a print job for printing the selected print target data. At this time, the job generation unit 11 generates a print job including identification information which is generated by the identification information generation unit 12. Meanwhile, as will be described later, in order to distinguish from identification information stored in the identification information storage unit 15, the identification information included in the print job will be referred to as "second identification information".

The identification information generation unit 12 is realized by the CPU 106 or the like, and in the case where print target data are selected by the user via the print application or the like, generates identification information for uniquely identifying a mobile terminal 10 which the user operates.

The network communication unit 13 is realized by the CPU 106, the communication I/F 107 or the like, and sends/receives data, such as a print job, via the network N1. The short-distance wireless communication unit 14 is realized by the CPU 106, the short-distance wireless communication device 10 or the like, and performs short-distance wireless communication with the image forming apparatus 30.

The identification information storage unit 15 is realized by the SSD 108, the ROM 105 or the like, and stores identification information generated by the identification information generation unit 12. Meanwhile, in order to distinguish from identification information included in a print job, identification information stored in the identification information storage unit 15 will be referred to as "first identification information".

<<Print Server>>

The printer server 20 includes a network communication unit 21, a print job management unit 22, a print job accumulation unit 23 and the like.

The network communication unit 21 is realized by the CPU 206, the communication I/F 207 or the like, and sends/receives data, such as a print job, via the network N1.

The print job management unit 22 is realized by the CPU 206 or the like, and accumulates a print job received via the network communication unit 21 in the print job accumulation unit 23. Moreover, the print job management unit 22, in response to a request from the image forming apparatus 30, acquires an appropriate print job from the print job accumulation unit 23.

The print job accumulation unit 23 is realized by the HDD 208 or the like, and stores a print job table 1000. The print job accumulation unit 23 accumulates print jobs received from the mobile terminals 10 via the network communication unit 21 in the print job table 1000. The design of the print job table 1000 stored in the print job accumulation unit 23 will be described later.

<<Image Forming Apparatus>>

The image forming apparatus 30 includes a job execution unit 31, an identification information determination unit 32, a network communication unit 33, a short-distance wireless communication unit 23, a print function unit 35 and the like.

The job execution unit 31 is realized by the CPU 311 or the like, and executes a print job selected by the user from print jobs received from the print server 20. Moreover, the job execution unit 31 aborts execution of the print job selected by the user in accordance with a determination result by the identification information determination unit 32.

The identification information determination unit 32 is realized by the CPU 311 or the like, and determines whether second identification information included in the print job, which is executed by the job execution unit 31, corresponds to (is identical with) first identification information received from the mobile terminal 10.

The network communication unit 33 is realized by the CPU 311, the communication I/F 304 and the like, and sends/receives various data to/from the mobile terminal 10 or the print server 20. The short-distance wireless communication unit 34 is realized by the CPU 311, the short-distance wireless communication device 306 or the like, and performs short-distance wireless communication with the mobile terminal 10.

The print function unit 35 is realized by the CPU 311, the printer 305 or the like, and prints the print target data included in the print job which is executed by the job execution unit 31.

Meanwhile, the image forming apparatus 30 may be provided with a scanning function unit for generating image data (electronic data) from a read-out document, a copying function unit for duplicating the read-out document, a facsimile function unit for performing facsimile transmission for the read-out document or the electronic data via a telephone line, or the like, in addition to the print function unit 35.

<<Print Job>>

The print job table 1000 stored in the print job accumulation unit 23 of the print server 20 has a design as shown in FIG. 6, for example. FIG. 6 is a diagram for explaining an example of a print job accumulated in the print server 20.

The print job table 1000 stored in the print job accumulation unit 23 is contains print jobs, each having data items such as "job ID", "user ID", "identification information", "print target data".

The "job ID" is information for uniquely identifying a print job in the overall print system 1. The "job ID" may be assigned upon the mobile terminal 10 generating the print job, or may be assigned upon the print job being saved in the print job accumulation unit 23 after the print server 20 receives the print job from the mobile terminal 10.

The "job ID" is user information for uniquely identifying a user (login user) who logs in on the mobile terminal 10 which generates the print job. For example, FIG. 6 shows that the print job with the "job ID" of "0001" is generated by a user who has the user ID of "user A".

The "identification information" is information for uniquely identifying the mobile terminal 10 which generates the print job. That is, the "identification information" is the above-described second identification information. For example, FIG. 6 shows that to the print job with the "job ID" of "0001", the second identification information "xxxabc" is assigned.

Meanwhile, the print job table 1000 may include a print job to which "identification information" is not assigned (blank). This is, for example, a print job sent from a PC or the like to the print server 20, or a print job sent from a mobile terminal or the like other than the mobile terminals 10 according to the present embodiment. For example, in the print job table 1000, the print job with the "job ID" of "0003" is a print job to which "identification information" is not assigned.

The "print target data" are data for which the user performs a print instruction using the print application and which are desired to be printed. For example, FIG. 6 shows that the print job with the "job ID" of "0001" specifies print target data "document A.pdf".

Meanwhile, each of the print jobs included in the print job table 1000 may include a data item to be used for authentication information upon executing the print job, such as "password" in addition to the above-described items, for example.

<Details of Processes>

Next, processes of the print system 1 according to the first embodiment will be explained in detail.

<<Print Job Accumulation Process>>

Figure 7:
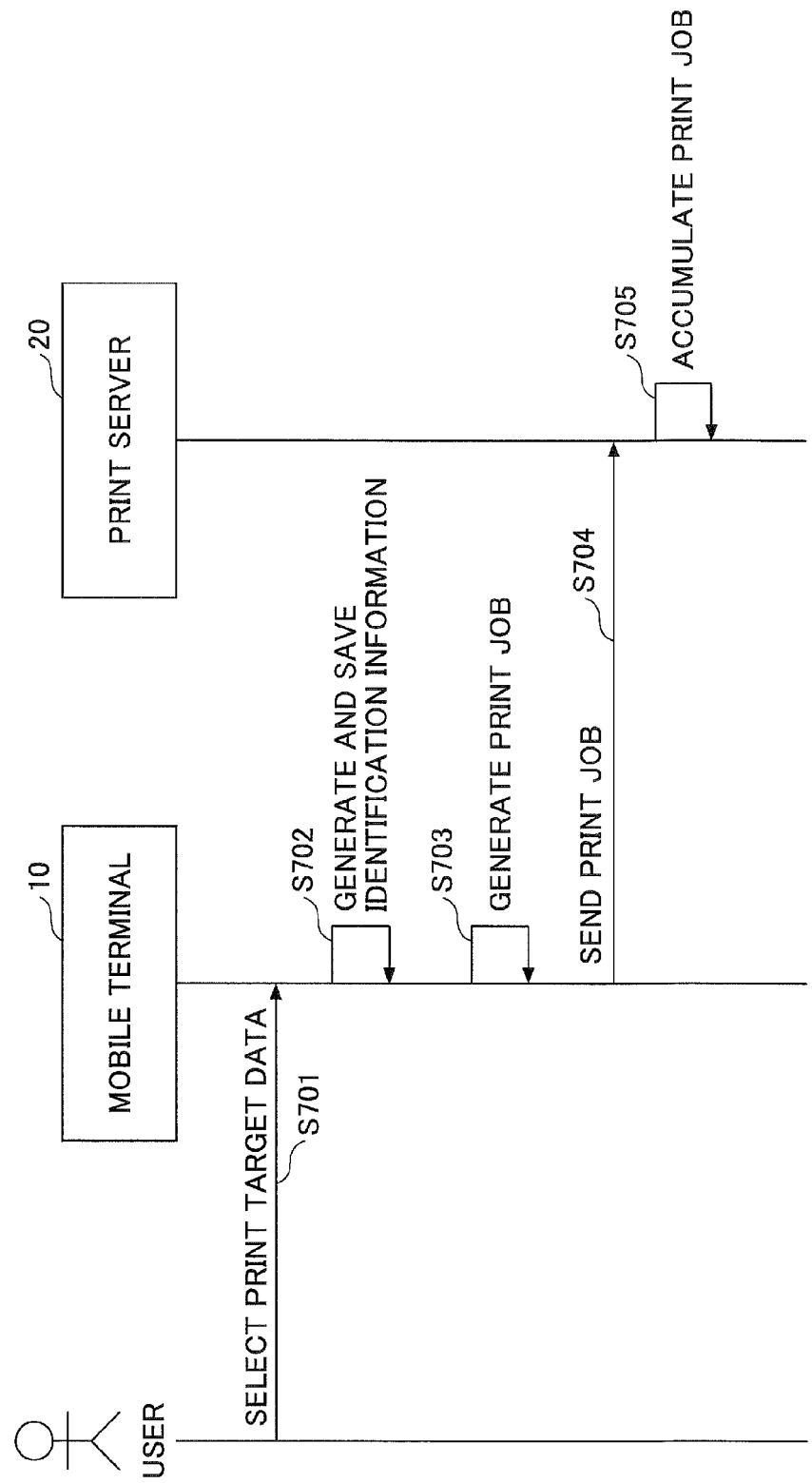
FIG. 7 is a sequence diagram illustrating an example of a print job accumulation process according to the first embodiment.

First, a print job accumulation process according to the present embodiment will be explained with reference to FIG. 7. The print job accumulation process accumulates a print job generated by a user using the mobile terminal 10 in the print server 20. FIG. 7 is a sequence diagram illustrating an example of the print job accumulation process according to the first embodiment.

The user selects print target data from print application installed in the mobile terminal 10 and performs a print instruction (step S701).

The identification information generation unit 12 of the mobile terminal 10 generates identification information, which uniquely identifies the mobile terminal 10, and stores it in the identification information storage unit 15 (step S702). Here, as described above, in order to distinguish it from identification information included in a print job to be generated in next step S703, the identification information stored in the identification information storage unit 15 will be referred to as "first identification information".

Here, the identification information generated by the identification information generation unit 12 is, for example, a product serial number such as a serial number or the like of the mobile terminal 10 or a physical address such as a MAC (Media Access Control) address. Moreover, for example, the identification information may be a UUID (Universally Unique Identifier), such as a value (hash value) obtained by inputting the above-described product serial number or the physical address into a hash function or the like of a predetermined algorithm. Furthermore, information obtained by appropriately combining the physical address, the product serial number, the UUID and the like may be used. That is, the identification information generated by the identification information generation unit 12 only has to be information that can uniquely identify the mobile terminal 10.

Meanwhile, for example, although a phone number, a MAC address or the like of the mobile terminal 10 can be used for uniquely identifying the mobile terminal 10, it is easy to be disguised or spoofed. Therefore, in this case, the UUID or the like which is a hash value of the phone number or the MAC address is preferably used.

The job generation unit 11 of the mobile terminal 10 generates a print job including user ID of the login user, and the identification information generated by the identification information generation unit 12 at step S702 and the print target data selected by the user at step S701 (step S703). Here, described as above, in order to distinguish from the identification information stored in the identification information storage unit 15, the identification information included in the print job generated by the job generation unit 11 will be referred to as "second identification information".

The mobile terminal 10 sends the generated print job to the print server 20 via the network communication unit 13 (step S704).

The print job management unit 22 of the print server 20, upon receiving the print job from the mobile terminal 10 via the network communication unit 21, accumulates the print job in the print job accumulation unit 23 (step S705).

According to the above-described configuration, the print job including the print target data for which the user performs print instruction at the mobile terminal 10 is accumulated in the print server 20.

The accumulated print job, described as above, is executed in the print process, which will be described next, for example, by the user performing short-distance wireless communication by holding the mobile terminal 10 over the image forming apparatus 30, and the print target data included in the print job are printed.

<<Print Process>>

Figure 8:
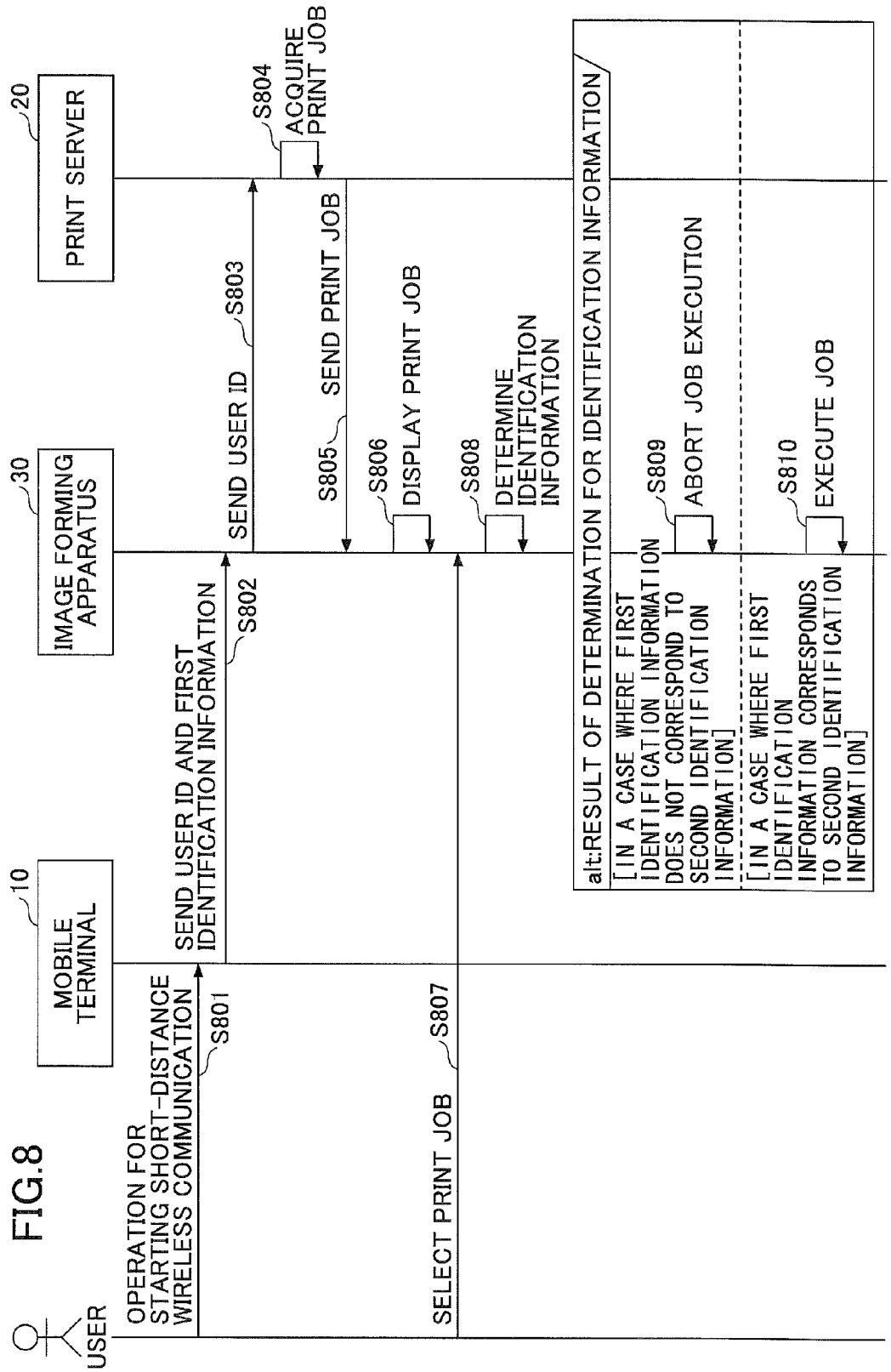
FIG. 8 is a sequence diagram illustrating an example of a print process according to the first embodiment.

Next, the print process according to the present embodiment will be explained with reference to FIG. 8. The print process is, for example, a process of printing the print target data included in the print job, which is accumulated by the above-described print job accumulation process, by the user performing short-distance wireless communication by holding the mobile terminal 10 over a predetermined position of the image forming apparatus 30. FIG. 8 is a sequence diagram illustrating an example of the print process according to the first embodiment.

The user performs an operation for starting short-distance wireless communication by using the mobile terminal 10 (step S801). That is, the user performs an operation of holding the mobile terminal 10 over a predetermined position of the image forming apparatus 30, at which an NFC chip is adhered or the like.

The short-distance wireless communication unit 14 of the mobile terminal 10 sends user ID of the login user and first identification information stored in the identification information storage unit 15 to the image forming apparatus 30 (step S802). Meanwhile, the short-distance wireless communication unit 14 may send the user ID and the first identification information to the image forming apparatus 30 by BLE.

According to the above-described operations, the user can log in the image forming apparatus 30. That is to say, the action of holding an IC card over an image forming apparatus, which a user conventionally performs upon logging in the image forming apparatus, is performed by holding the mobile terminal 10 over the image forming apparatus 30.

Meanwhile, the mobile terminal 10 may send the user ID and the first identification information to the image forming apparatus 30 via the network communication unit 13. That is, in a case where the user holds the mobile terminal 10 over the predetermined position of the image forming apparatus 30, the short-distance wireless communication unit 14 of the mobile terminal 10 acquires an SSID (Service Set Identifier) for identifying the network N1 to be connected, an IP (Internet Protocol) address of the image forming apparatus 30, or the like. Then, the mobile terminal 10 may send the user ID and the first identification information to the image forming apparatus 30 via the network communication unit 13 based on the acquired SSID, the IP address or the like.

Meanwhile, not limited to the above, after the user holds the mobile terminal 10 over the predetermined position of the image forming apparatus 30, the mobile terminal 10 may send the user ID and the first identification information to the image forming apparatus 30 by various wireless communications such as Bluetooth (trademark registered), infrared communication, for example.

Moreover, the user ID and the first identification information may be sent to the image forming apparatus 30 by reading out a QR code (trademark registered) which is adhered to a predetermined position on a chassis of the image forming apparatus 30 by a camera device (not shown) of the mobile terminal 10. That is, the user reads out the QR code adhered to the chassis of the image forming apparatus 30 by using the camera device (not shown) of the mobile terminal 10, and acquires an SSID, an IP address or the like, in the same way as above. Then, the mobile terminal 10 may send the user ID and the first identification information to the image forming apparatus 30 via the network communication unit 13 based on the acquired SSID, IP address or the like.

The network communication unit 33 of the image forming apparatus 30 sends the user ID received by the short-distance wireless communication unit 34 to the print server 20, and requires to acquire the print job including this user ID (step S803).

The print job management unit 22 of the print server 20, upon receiving the user ID of the mobile terminal 10 from the image forming apparatus 30, acquires a predetermined print job of the print jobs including this user ID from the print job accumulation unit 23 (step S804). The print job acquisition process at step S804 will be described later in detail.

The network communication unit 21 of the print server 20 sends the print job acquired at step S804 to the image forming apparatus 30 (step S805).

The image forming apparatus 30 displays information, which identifies a print job received from the print server 20, such as a job ID of the print job, a name of print target data, or the like, on the operation panel 302 (step S806). That is, the image forming apparatus 30 displays a print job selection screen for a user selecting a print job on the operation panel 302. In the print job selection screen, job IDs, names of print target data, or the like are displayed.

The user selects a print job, which the user desires to print, from information specifying print jobs displayed on the operation panel 302 of the image forming apparatus 30 (step S807). That is to say, the user selects the print job that the user desires to print from the print job selection screen.

The identification information determination unit 32 of the image forming apparatus 30 determines whether the first identification information received from the mobile terminal 10 corresponds to (is identical with) second information included in the print job selected by the user at step S807, as above (step S808). The image forming apparatus 30 performs a process of step S809 in a case where a determination result by the identification information determination unit 32 shows that the first identification information does not correspond to (is not identical with) the second identification information. On the other hand, in a case where it shows that the first identification information corresponds to (is identical with) the second identification information, a process of step S810 is performed.

In the case where the first identification information does not correspond to (is not identical with) the second identification information, the job execution unit 31 of the image forming apparatus 30 causes the process to end without performing (by aborting) the execution of the print job selected by the user at step S807, as above (step S809). Meanwhile, at this time, the image forming apparatus 30 may display on the operation panel 302, a screen indicating that the print job cannot be executed.

In the case where the first identification information corresponds to (is identical with) the second identification information, the job execution unit 31 executes the print job selected by the user at step S807, as above, and the print function unit 35 prints print target data included in the print job (step S810).

As stated above, the print target data included in the print job selected by the user are printed at the image forming apparatus 30.

Moreover, upon the print job being executed, it is determined whether the first identification information stored in the mobile terminal 10 of the user corresponds to (is identical with) the second identification information included in the print job to be executed, and in the case where the first identification information does not correspond to (is not identical with) the second identification information, the execution of the print job can be prevented. According to the above-described configuration, unintended execution of print jobs according to spoofing or the like by others can be prevented. Since generally, in a mobile terminal 10, user ID is easy to be disguised, different from an ID card or the like, unintended execution of print jobs according to spoofing or the like by others can be effectively prevented.

Moreover, since it is possible to log in to the image forming apparatus 30 by using the mobile terminal 10, an IC card becomes unnecessary. A manufacturing cost or purchasing cost for the IC card is unnecessary. Then, a cost reduction can be achieved.

<<Print Job Acquisition Process>>

Figure 9:
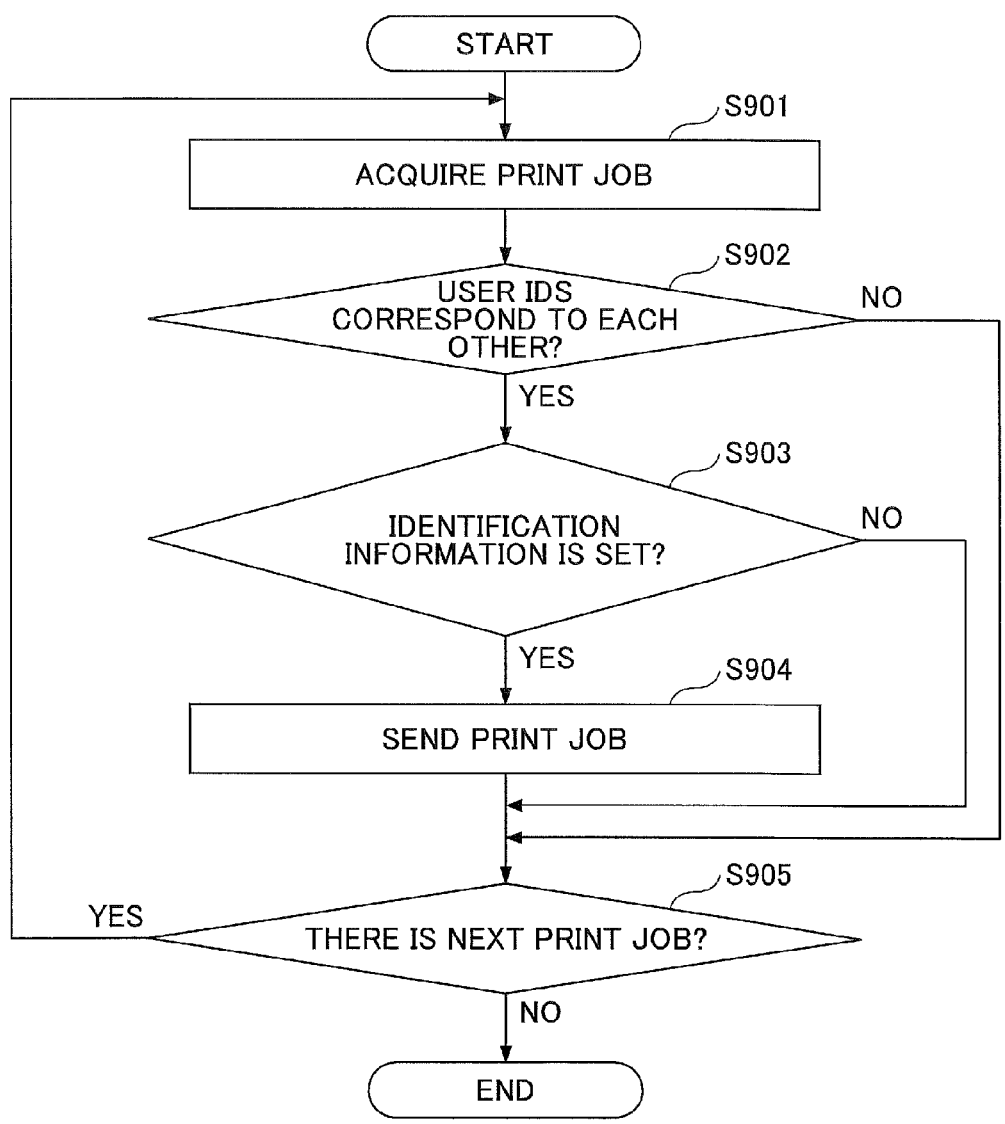
FIG. 9 is a flowchart illustrating an example of a print job acquisition process according to the first embodiment.

Subsequently, the print job acquisition process at step 804 in the above-described print process will be explained with reference to FIG. 9. FIG. 9 is a flowchart illustrating an example of the print job acquisition process according to the first embodiment.

The print job management unit 22 of the print server 20 acquires a record of a print job from the print job accumulation unit 23 (step S901).

The print job management unit 22 of the print server 20 determines whether user ID included in the print job acquired at step S901, as above, corresponds to user ID received from the image forming apparatus 30 (step S902). In a case where the user IDs correspond to each other, the process proceeds to step S903. On the other hand, in the case where the user IDs do not correspond to each other, the process proceeds to step S905.

Accordingly, the print job management unit 22 of the print server 20 determines whether identification information is set in the print job acquired at step S901, as above (step S903). In a case identification information is set, the process proceeds to step S904. On the other hand, in a case where identification information is not set, the process proceeds to S905.

Accordingly, a print job, in which identification information is not set, is not sent to the image forming apparatus 30, and execution of the print job is not performed by the user. That is to say, the print job, in which identification information is not set, is not displayed in the print job selection screen, which is described at step S806 in FIG. 8.

For example, in the case where used ID that the print server 20 receives from the image forming apparatus 30 is "user_A", a print job with job ID of "0001" of the print jobs included in a print job table 1000, shown in FIG. 6, is sent to the image forming apparatus 30. On the other hand, a print job with job ID of "0003" is not sent to the image forming apparatus 30.

Meanwhile, at this time, the network communication unit 21 of the print server 20 sends the print job acquired at step S901, as above, to the image forming apparatus 30 (step S904).

Meanwhile, at this time, the network communication unit 21 of the print server 20 may send to the image forming apparatus 30 information identifying a print job, such as job ID of the print job or a name of print target data, and second identification information. According to the above-described configuration, since the print job itself is not sent to the image forming apparatus 30, network traffic or the like can be reduced. In the above-described case, before executing the process at step S810 in FIG. 8, the print job selected by the user at step S807 in FIG. 8 only has to be sent from the print server 20 to the image forming apparatus 30.

The print job management unit 22 of the print server 20 determines whether a next print job exists in the print job accumulation unit 23 (step S905). In a case where a next print job exists, the process returns to step S901, and the next print job is acquired. On the other hand, in a case where a next print job does not exist, the process ends.

As stated above, a print job of the print jobs accumulated in the print server 20, which corresponds to the user ID of the login user and includes second identification information, can be sent to the image forming apparatus 30.

Meanwhile, the process at step S903, as above, may not be performed. That is, irrespective of whether identification information is set, all print jobs including user ID which corresponds to the user ID received from the image forming apparatus 30 may be sent to the image forming apparatus 30. According to the above-described configuration, in the print job selection screen, which is described for step S806 in FIG. 8, a print job in which identification information is not set is also displayed, and the user can execute the print job.

Described as above, in the print system 1 according to the present embodiment, a user can generate a print job including second identification information from a mobile terminal 10, and accumulate it in the print server 20. Then, upon the user executing the print job at the image forming apparatus 30, it is determined whether first identification information stored in the mobile terminal 10 corresponds to second identification information included in the print job to be executed, and the print job is executed only in a case where the first identification information corresponds to the second identification information. Accordingly, unintended execution of print jobs according to spoofing or the like by others can be prevented, and prevention of leakage of print target data can be achieved.

Second Embodiment

Next, a print system 1 according to a second embodiment will be explained. The print system 1 according to the second embodiment is different from the first embodiment in that the print server 20 determines whether first identification information corresponds to second identification information. Meanwhile, in the following, for a component having substantially the same function as the first embodiment and performing the same process, the same reference numeral will be used and an explanation thereof will be omitted.

<Software Configuration>

Figure 10:
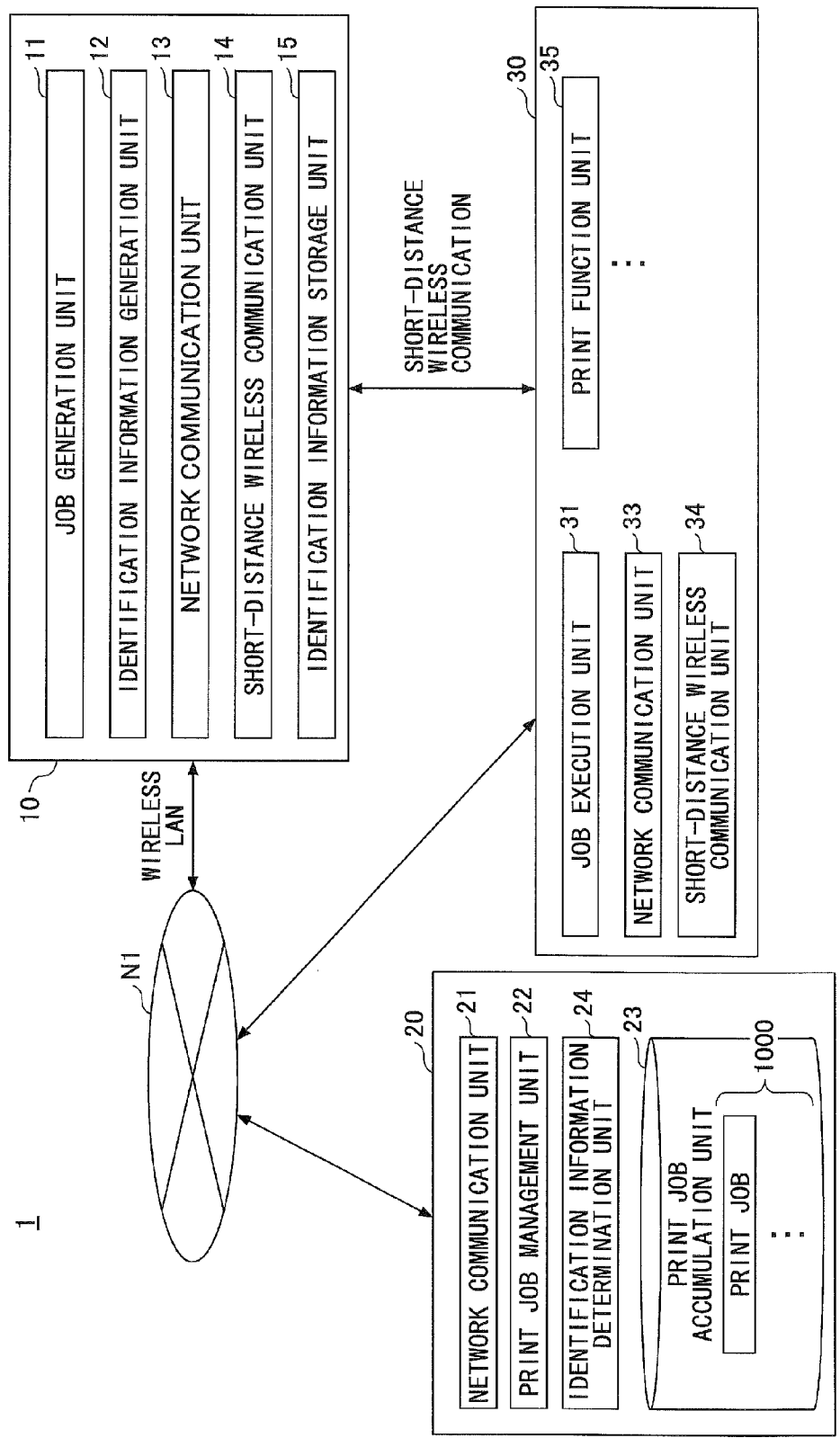
FIG. 10 is a functional block diagram illustrating an example of a print system according to a second embodiment.

The print system 1 according to the present embodiment can be expressed by functional blocks, as shown in FIG. 10, for example. FIG. 10 is a functional block diagram illustrating an example of the print system according to the second embodiment. Meanwhile, the functional block of the mobile terminal 10 is the same as in the first embodiment. Moreover, the functional block of the image forming apparatus 30 does not include the identification information determination unit 32.

<<Print Server>>

The print server 20 includes an identification information determination unit 24. The identification information determination unit 24 is realized by the CPU 206 or the like, and determines, for a print job that the print job management unit 22 acquires from the print job accumulation unit 23, whether second identification information included in this print job corresponds to first identification information received from the image forming apparatus 30.

<Details of Process>

Next, the process of the print system 1 according to the second embodiment will be explained in detail. Meanwhile, a print job accumulation process according to the second embodiment is the same as the print job accumulation process according to the first embodiment, and an explanation thereof will be omitted.

<<Print Process>>

Figure 11:
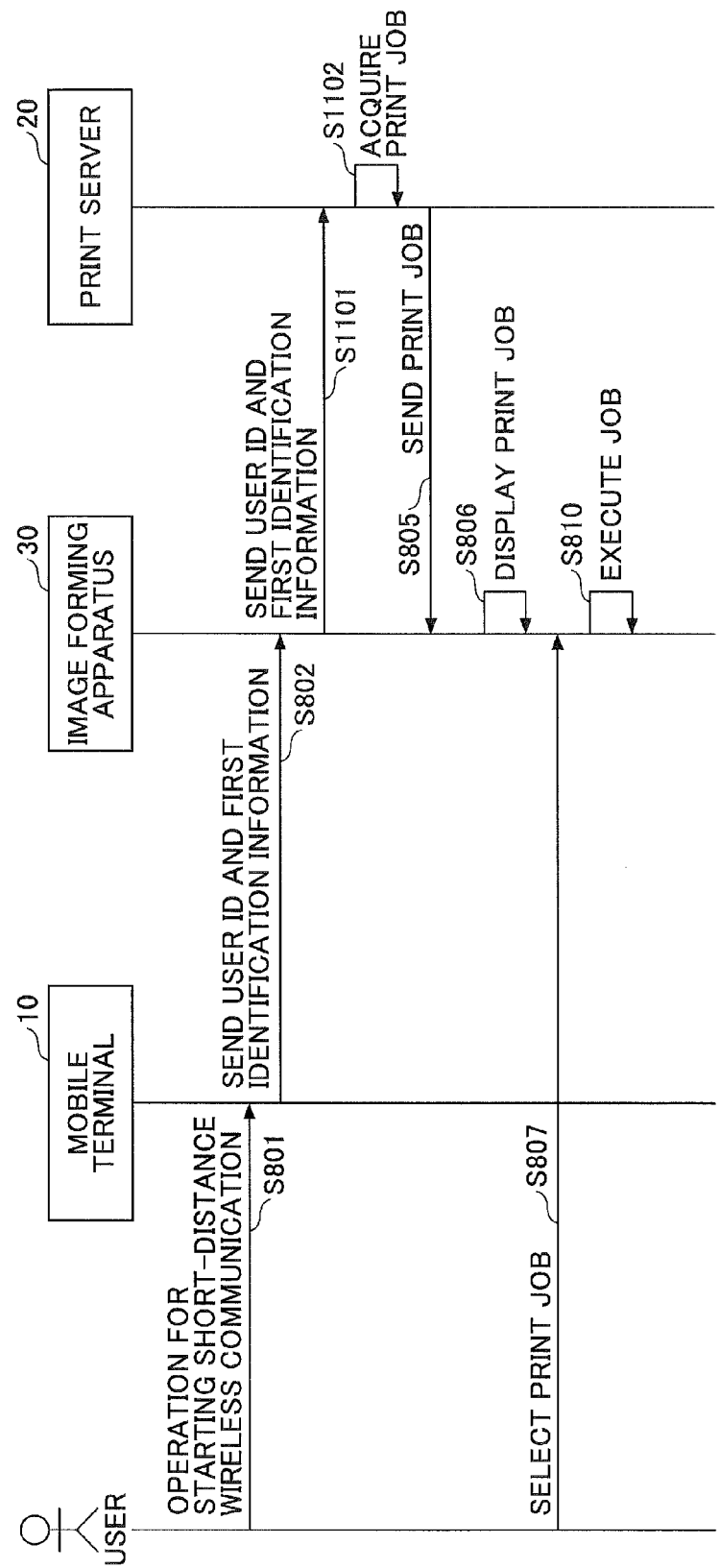
FIG. 11 is a sequence diagram illustrating an example of a print process according to the second embodiment.

A print process according to the second embodiment will be explained with reference to FIG. 11. FIG. 11 is a sequence diagram illustrating an example of a print process according to the second embodiment.

The network communication unit 33 of the image forming apparatus 30 sends user ID received from the mobile terminal 10 and first identification information to the print server 20, and requires to acquire a print job including the user ID and the first identification information (step S1101).

The print server management unit 22 of the print server 20, upon receiving the user ID and the first identification information from the image forming apparatus 30, performs a print job acquisition process (step S1102). The print job acquisition process according to the present embodiment will be described later in detail.

Here, in the print process according to the second embodiment, since a print job that the user can execute is acquired in the print job acquisition process which will be described later, different from the first embodiment, the processes at steps S808 and S809 in FIG. 8 are not performed. That is to say, all the print jobs displayed in the print job selection screen at step S806 are print jobs that the user can execute.

<<Print Job Acquisition Process>>

Figure 12:
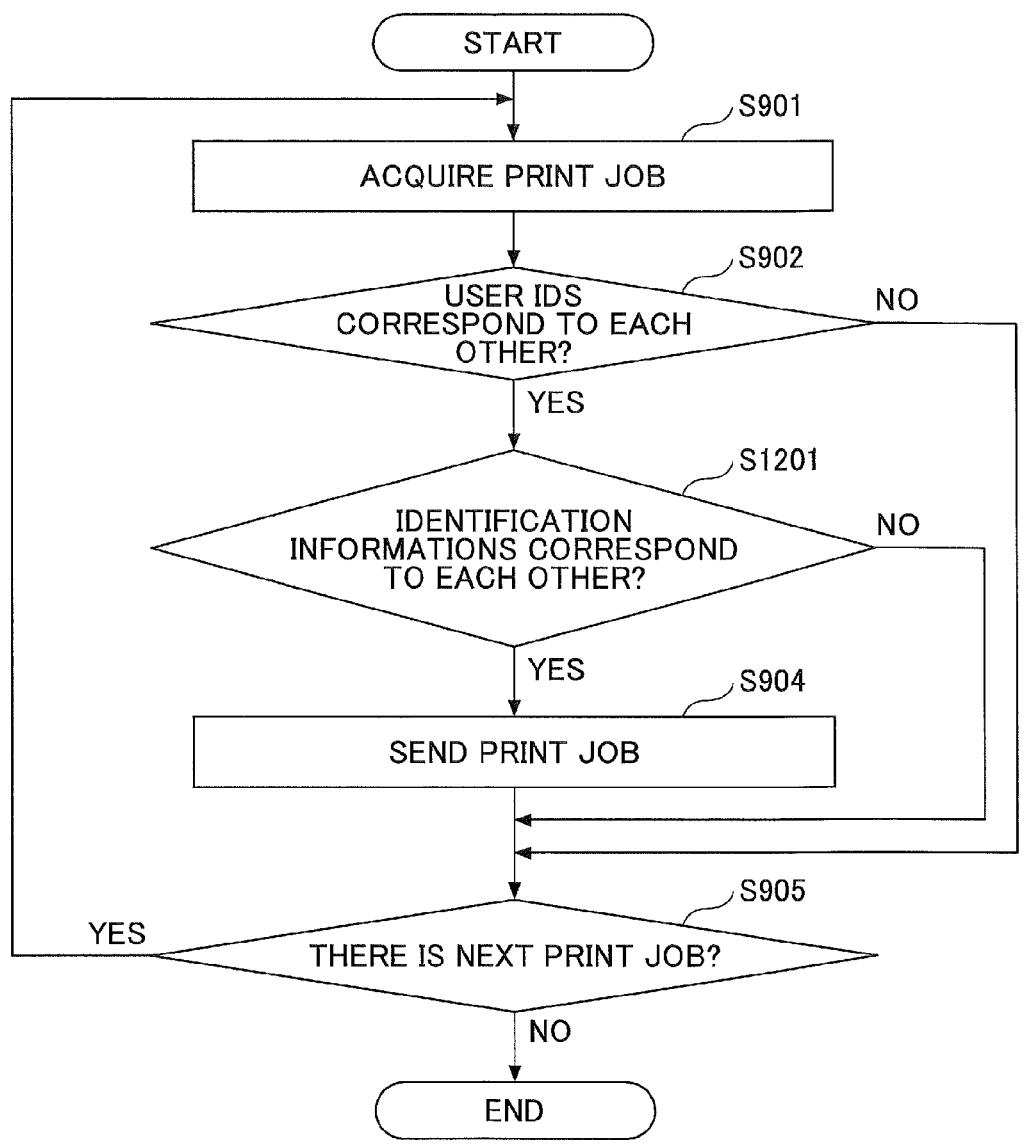
FIG. 12 is a flowchart illustrating an example of a print job acquisition process according to the second embodiment.

Next, the print job acquisition process at step S1102 in the print process, described as above, will be explained with reference to FIG. 12. FIG. 12 is a flowchart illustrating an example of the print job acquisition process according to the second embodiment. In the print job acquisition process according to the second embodiment, a process at step S1201 is different from the print job acquisition process according to the first embodiment.

The identification information determination unit 24 of the print server 20 determines whether second identification information included in the print job acquired at step S901 corresponds to the first identification information received from the image forming apparatus 30 (step S1201). The print server 20 performs a process at step S904 in a case where a determination result by the identification information determination unit 24 shows that the first identification information corresponds to the second identification information. On the other hand, in a case where the determination result by the identification information determination unit 24 shows that the first identification information does not correspond to the second identification information, the process proceeds to step S905.

Thus, at step S904, only a print job including second identification information which corresponds to the first identification information (that is to say, a print job that the user can execute) is sent to the image forming apparatus 30. Accordingly, different from the first embodiment, in the print server 20 according to the second embodiment, unnecessary print jobs that the user cannot execute can be prevented to be sent to the image forming apparatus 30. Moreover, even if spoofing is performed by others, leakage of names or the like of print target data included in print jobs can be prevented.

Third Embodiment

Next, a print system 1 according to a third embodiment will be explained. The print system 1 according to the third embodiment is different from the first embodiment in that first identification information is preliminarily generated at the mobile terminal 10 and the generated first identification information is registered in the image forming apparatus 30. Meanwhile, in the following, for a component having substantially the same function as the first embodiment and performing the same process, the same reference numeral will be used and an explanation thereof will be omitted.

<Software Configuration>

Figure 13:
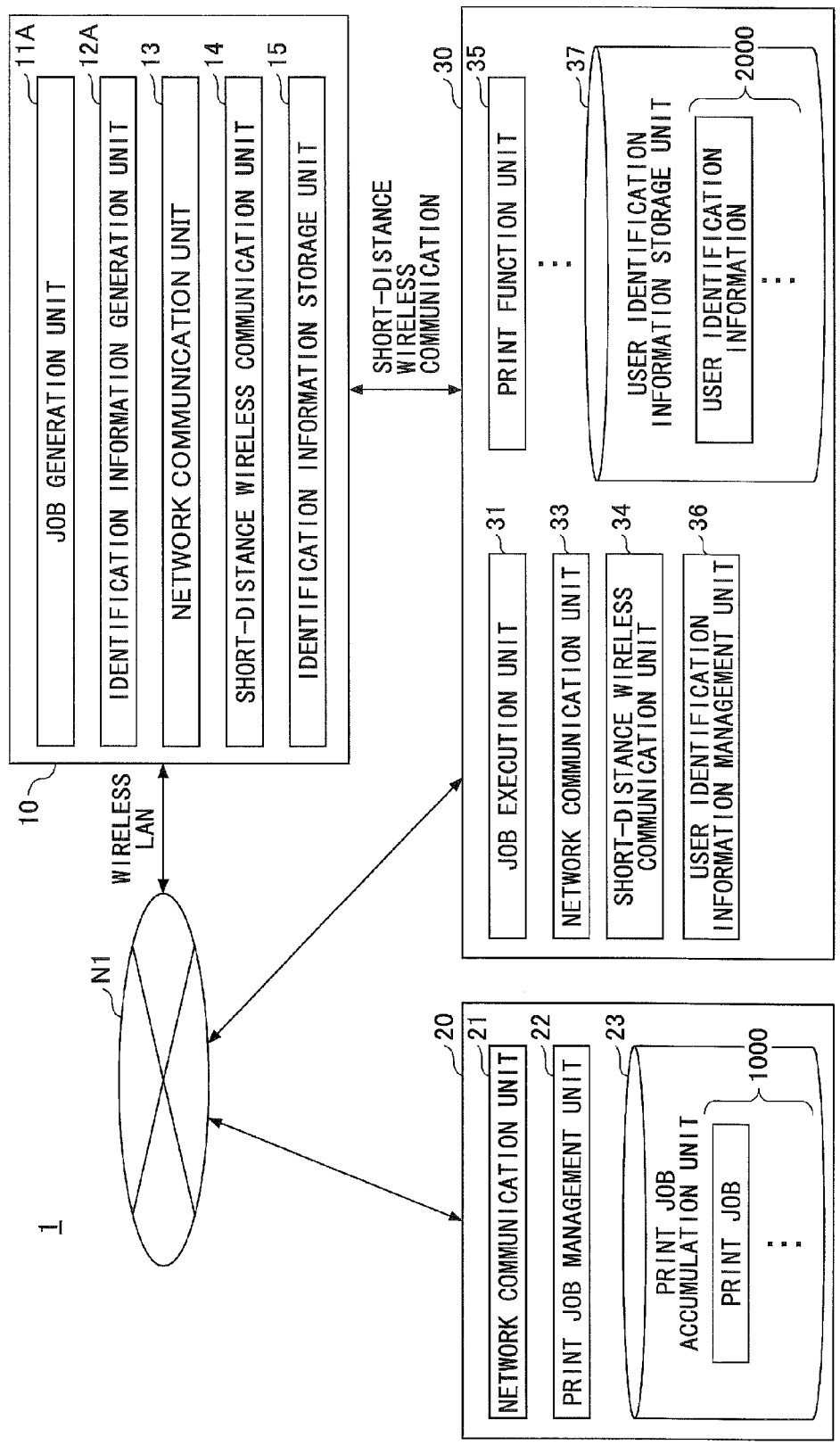
FIG. 13 is a functional block diagram illustrating an example of a print system according to a third embodiment.

The print system 1 according to the present embodiment can be expressed by functional blocks, as shown in FIG. 13, for example. FIG. 13 is a functional block diagram illustrating an example of the print system according to the third embodiment. Meanwhile, the functional block of the print server 20 is the same as in the first embodiment.

<<Mobile Terminal>>

The mobile terminal 10 according to the present embodiment includes a job generation unit 11A and an identification information generation unit 12A.

The job generation unit 11A, upon print target data being selected by a user via print application or the like, generates a print job. At this time, the job generation unit 11A according to the present embodiment, different from the first embodiment, generates a print job that does not include identification information (second identification information). That is, the job generation unit 11A generates a print job including user ID and print target data.

Accordingly, in the present embodiment, a print job, which is included in a print job table 1000 stored in the print job accumulation unit 23 of the print server 20, does not include identification information (second identification information).

The identification information generation unit 12A generates identification information for uniquely identifying the mobile terminal 10. The identification information generation unit 12A according to the present embodiment generates identification information, for example, upon a program, which is installed in the mobile terminal 10 and realizes the present embodiment, starting for the first time. Then, the identification information generation unit 12A stores the generated identification information into the identification information storage unit 15.

<<Image Forming Apparatus>>

The image forming apparatus 30 according to the present embodiment includes a user identification information management unit 36 and a user identification information determination unit 37. Moreover, the image forming apparatus 30 according to the present embodiment does not include the identification information determination unit 32.

The user identification information management unit 36 is realized by the CPU 106 or the like, and generates user identification information associated with user ID inputted by the user in accordance with first identification information received from the mobile terminal 10 via the short-distance wireless communication unit 34. More specifically, the user identification information management unit 36, upon receiving the first identification information from the mobile terminal 10, determines whether the first identification information is registered in the user identification information storage unit 37. Then, the user identification information management unit 36, in a case of determining that the first identification information is not registered in the user identification information storage unit 37, requires the user to input user ID, and associates the inputted user ID with the first identification information, thereby generates the user identification information.

Moreover, the user identification information management unit 36 stores the generated user identification information in the user identification information storage unit 37.

The user identification information storage unit 37 is realized by the HDD 315 or the like, and stores a user identification information table 2000.

Figures 14, 15:
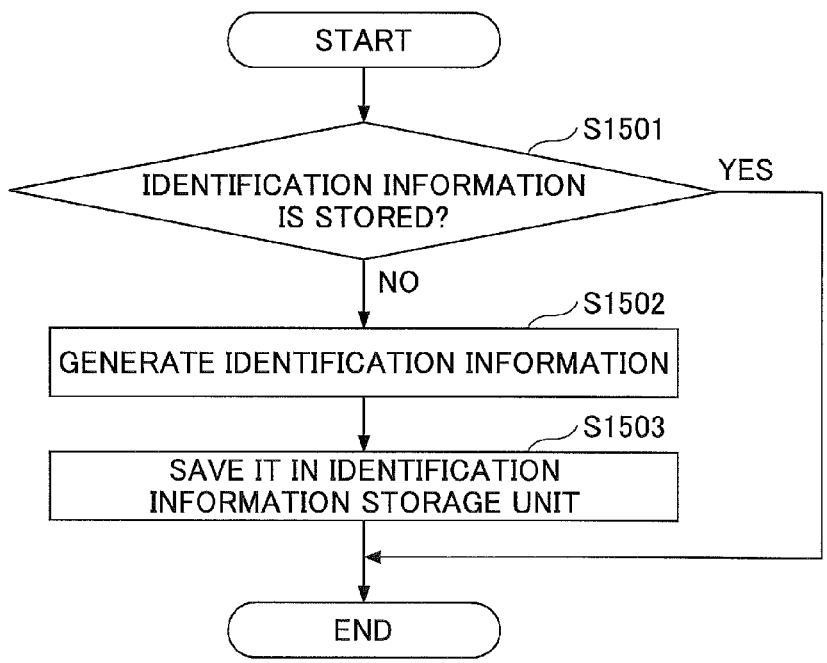
FIG. 14 is a diagram for explaining an example of a design of a user identification information table according to the third embodiment.
FIG. 15 is a flowchart illustrating an example of a generation process of identification information according to the third embodiment.

Here, a configuration of the user identification information table 2000 stored in the user identification information storage unit 37 will be explained. FIG. 14 is a diagram for explaining an example of a configuration of the user identification information table.

The user identification information table 2000 stored in the user identification information storage unit 37 contains user identification information, each set having data items of "user ID" and "identification information".

The "user ID" is user information for uniquely identifying a user (login user) in the image forming apparatus 30. The "identification information" is identification information stored in the identification information storage unit 15 of the mobile terminal 10 (that is, first identification information).

Meanwhile, as shown in FIG. 14, the user identification information table 2000 may store user identification information sets in which different pieces of identification information "xxxabc", "xxx123" are associated with the same user ID "user_A". Thus, the user can perform execution of print jobs by using plural mobile terminals 10.

Meanwhile, each of the user identification information sets included in the user identification information table 2000 may include a data item such as a terminal type (e.g. a smartphone, a mobile phone or a tablet terminal) of the mobile terminal 10 which generates the first identification information.

<Details of Processes>

Next, processes of the print system 1 according to the third embodiment will be explained in detail.

<<Generation Process of Identification Information>>

First, a process of generating identification information at the mobile terminal 10 will be explained using FIG. 15. The process of generating identification information, which will be explained in the following, is executed, for example, in a case where a program, which is installed in the mobile terminal 10 and realizes the present embodiment, starts for the first time after installation. FIG. 15 is a flowchart illustrating an example of the process of generating identification information according to the third embodiment.

The identification information generation unit 12A of the mobile terminal 10 determines whether first identification information is stored in the identification information storage unit 15 (step S1501). In a case where first identification information is not stored in the identification information storage unit 15, the process proceeds to step S1502. On the other hand, in a case where first identification information is already stored in the identification information storage unit 15, the process ends.

Next, the identification information generation unit 12A of the mobile terminal 10 generates identification information (step S1502). Here, the generated identification information is, for example, an UUID or the like, in the same way as in the first embodiment.

Then, the identification information generation unit 12A of the mobile terminal 10 stores the generated identification information in the identification information storage unit 15 (step S1503). Thus, first identification information is stored in the identification information storage unit 15.

As stated above, in the mobile terminal 10 according to the present embodiment, identification information is generated and stored in the case where the program, which realizes the present embodiment, starts for the first time after its installation.

<<Process of Registering User Identification Information>>

Figure 16:
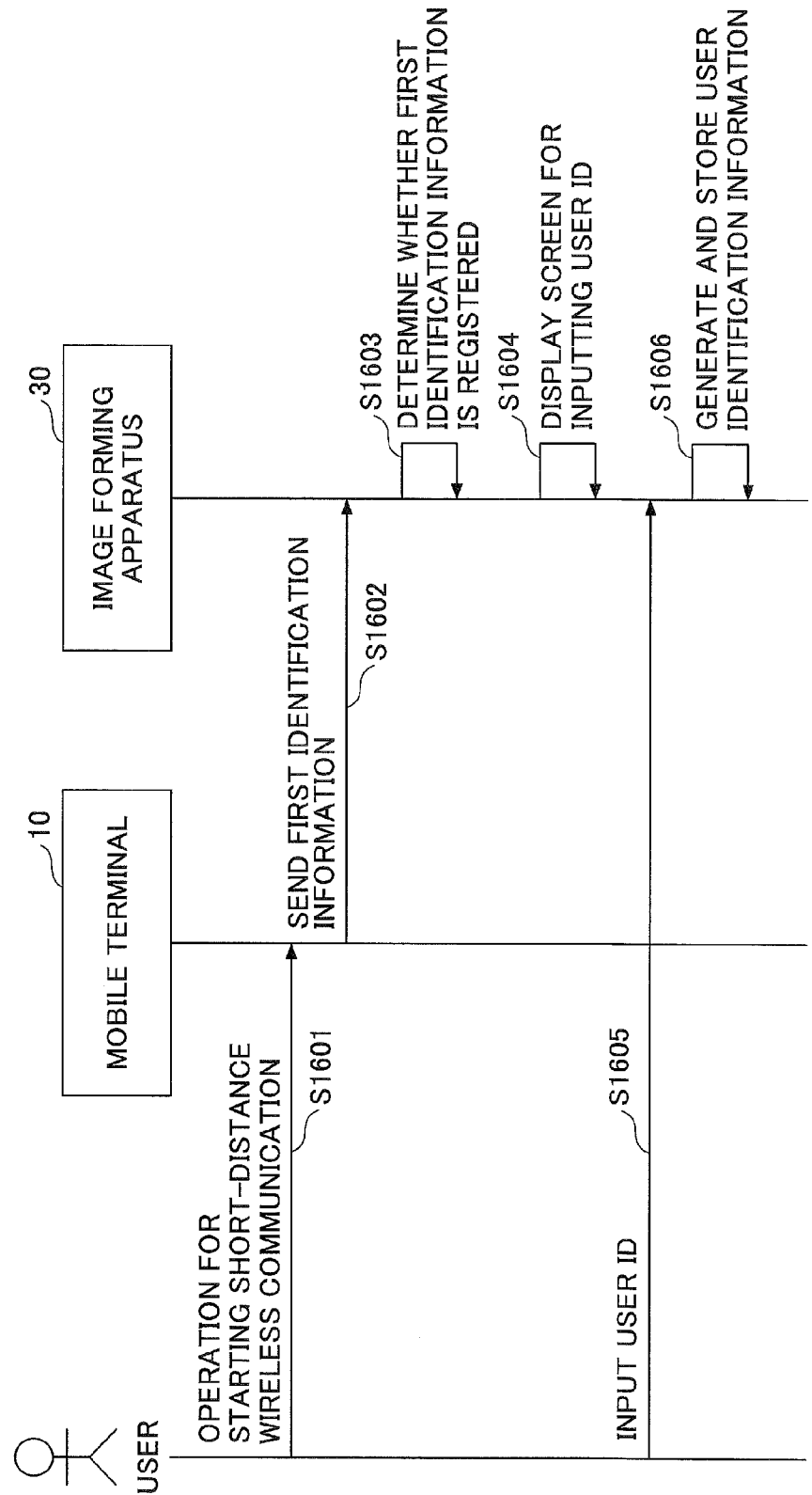
FIG. 16 is a sequence diagram illustrating an example of a registration process of user identification information according to the third embodiment.

Next, a process of registering the first identification information stored in the mobile terminal 10 with the image forming apparatus 30 will be explained using FIG. 16. FIG. 16 is a sequence diagram illustrating an example of the process of registering user identification information according to the third embodiment.

A user performs an operation for starting the short-distance wireless communication using the mobile terminal 10 (step S1601). That is, the user performs an operation of holding the mobile terminal 10 over a predetermined position at which an NFC chip is adhered or the like to the image forming apparatus 30.

The short-distance wireless communication unit 14 of the mobile terminal 10 sends the first identification information stored in the identification information storage unit 15 to the image forming apparatus 30 (step S1602). Meanwhile, the short-distance wireless communication unit 14 may send the first identification information to the image forming apparatus 30 by short-distance wireless communication such as BLE.

The user identification information management unit 36 of the image forming apparatus 30, upon receiving the first identification information by the short-distance wireless communication unit 34, determines whether this first identification information is registered in the user identification information storage unit 37. That is, the user identification information management unit 36 determines whether user identification information including the received first identification information is stored in the user identification information table 2000. In the following, the explanation continues assuming that the user identification information management unit 36 determines that the received first identification information is not registered in the user identification information storage unit 37.

Figure 18:
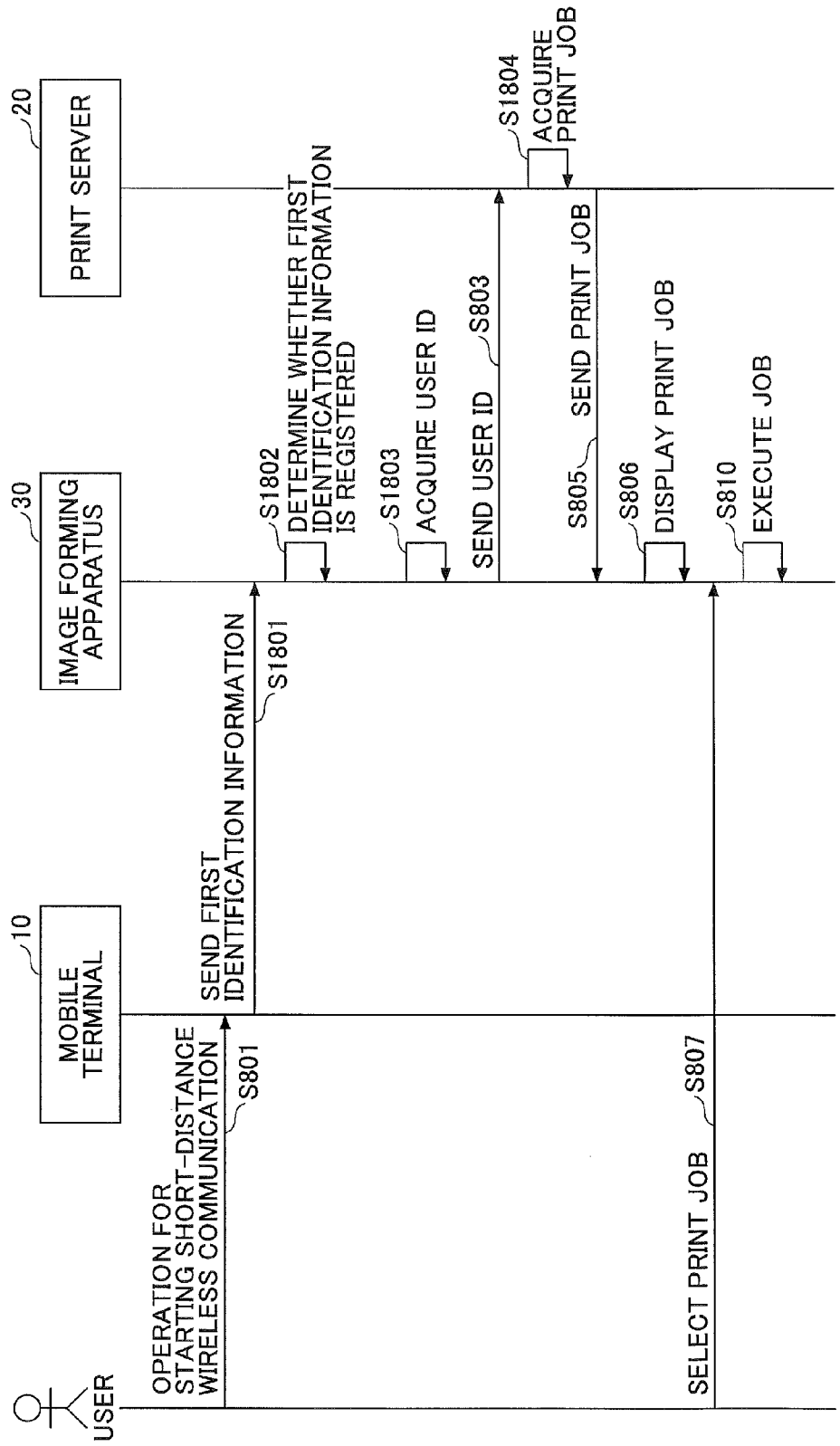
FIG. 18 is a sequence diagram illustrating an example of a print process according to the third embodiment.

Meanwhile, in a case where it is determined that the received first identification information is registered in the user identification information storage unit 37, the image forming apparatus 30 only has to execute processes after step S1803 of print processes, which will be described later using FIG. 18. Or, the image forming apparatus 30 may execute the above-described processes after step S1803, in a case where after requiring the user to input authentication information, such as user ID or a password, authentication is successful.

The image forming apparatus 30 displays a user ID input screen for causing the user to input user ID on the operation panel 302, for example (step S1604). Meanwhile, the image forming apparatus 30 may display a password input screen for causing the user to input a password corresponding to the user ID in addition to the user ID input screen. Moreover, the image forming apparatus 30 may display the user ID input screen on the display device 102 of the mobile terminal 10.

The user performs an input operation of inputting the own user ID in the user ID input screen displayed on the operation panel 302 of the image forming apparatus 30 (step S1605).

The user identification information management unit 36 of the image forming apparatus 30 associates the inputted user ID with the first identification information received at step S1603, as above, and generates user identification information (step S1606). Then, the user identification information management unit 36 stores the generated user identification information in the user identification information table 2000 of the user identification information management unit 36. Thus, the identification information generated at the user's mobile terminal 10 is associated with the user ID and registered with the image forming apparatus 30.

Meanwhile, at step S1606, the image forming apparatus 30 may perform an authentication process of determining whether the user ID inputted by the user is valid, and in a case where the authentication is successful, generate the user identification information. For example, the image forming apparatus 30 causes the user to input user ID and a password at step S1605, and performs an authentication process of determining whether a combination of the inputted user ID and the password is correct. Then, the image forming apparatus 30 may, in a case of obtaining an authentication result indicating that the authentication is successful, associate the inputted user ID with the first identification information, and generate the user identification information.

<<Print Job Accumulation Process>>

Figure 17:
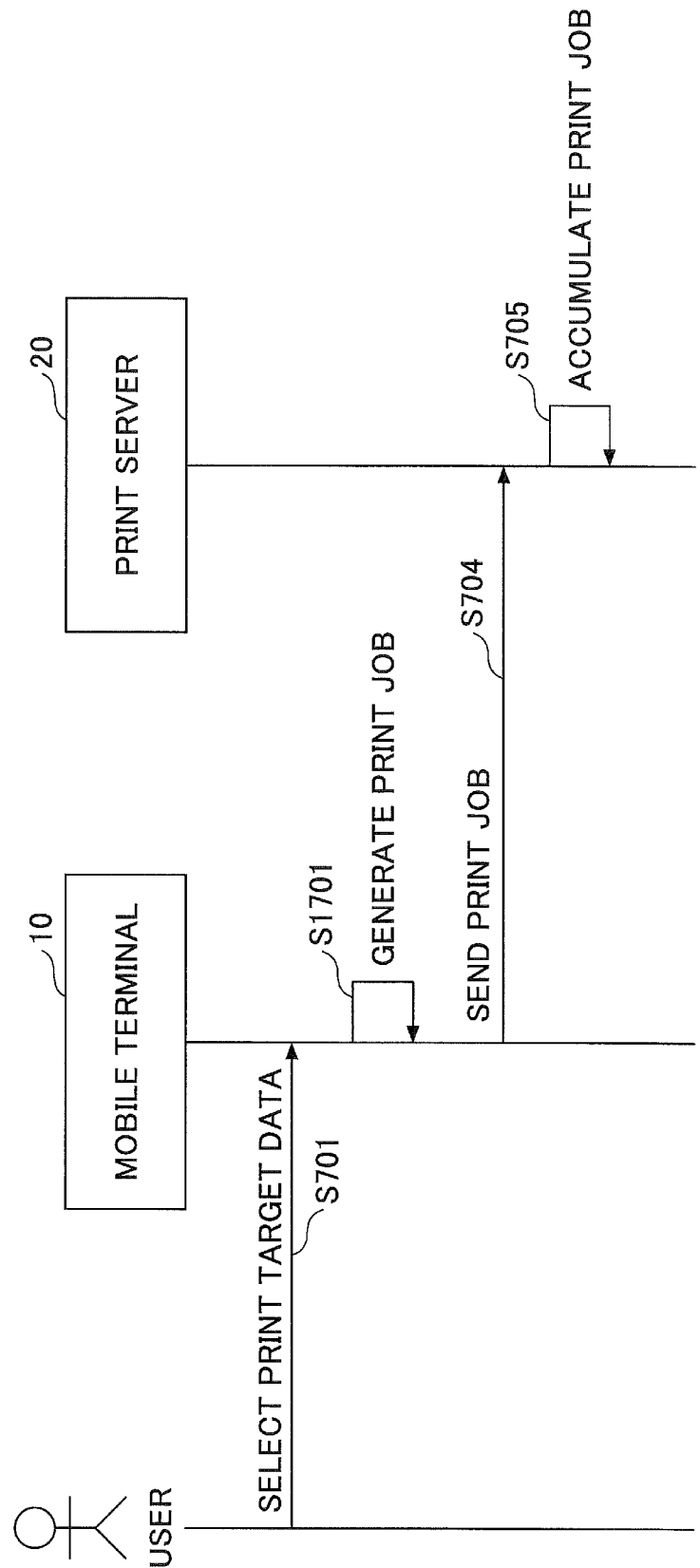
FIG. 17 is a sequence diagram illustrating an example of a print job accumulation process according to the third embodiment.

Next, a print job accumulation process according to the present embodiment will be explained using FIG. 17. FIG. 17 is a sequence diagram illustrating the print job accumulation process according to the third embodiment.

The job generation unit 11A of the mobile terminal 10 generates a print job including the user ID of the user and the print target data selected by the user at step S701 (step S1701). In this way, in the print job accumulation process according to the present embodiment, the generated print job does not include second identification information. For this reason, the print job table 1000 stored in the print job accumulation unit 23 of the print server 20 need not to include a data item of "identification information".

<<Print Process>>

Next, a print process according to the present embodiment will be explained using FIG. 18. FIG. 18 is a sequence diagram illustrating an example of the print process according to the third embodiment.

The short-distance wireless communication unit 14 of the mobile terminal 10 sends the first identification information stored in the identification information storage unit 15 to the image forming apparatus 30 (step S1801). In this way, the mobile terminal 10 according to the present embodiment only has to send the first identification information to the image forming apparatus 30, and need not to send the user ID of the user to the image forming apparatus 30.

The user identification information management unit 36 of the image forming apparatus 30, upon receiving the first identification information by the short-distance wireless communication unit 34, determines whether the first identification information is registered in the user identification information storage unit 37 (step S1802). That is, the user identification information management unit 36 determines whether user identification information including the received first identification information is stored in the user identification information table 2000. In the following, the explanation continues assuming that the user identification information management unit 36 determines that the received first identification information is registered in the user identification information storage unit 37.

Meanwhile, in a case where it is determined that the received first identification information is not registered in the user identification information storage unit 37, the image forming apparatus 30 only has to execute processes after step S1604 of the processes of registering user identification information, which is described above using FIG. 16.

The user identification information management unit 36 of the image forming apparatus 30 acquires user identification information including the received first identification information from the user identification information table 2000 (step S1803). Then, the user identification information management unit 36 acquires the user ID included in the acquired user identification information. That is to say, the user identification information management unit 36 acquires user ID corresponding to the first identification information received at step S1802 in the user identification information table 2000.

In this way, in the image forming apparatus 30 according to the present embodiment, user ID which is preliminarily associated with first identification information is acquired.

The print job management unit 22 of the print server 20, upon receiving the user ID from the image forming apparatus 30, performs a print job acquisition process (step S1804). The print job acquisition process according to the present embodiment will be described later in detail. Meanwhile, in the print process according to the third embodiment, in the same way as in the second embodiment, in the print job acquisition process, which will be described later, a print job that the user can execute is acquired.

<<Print Job Acquisition Process>>

Figure 19:
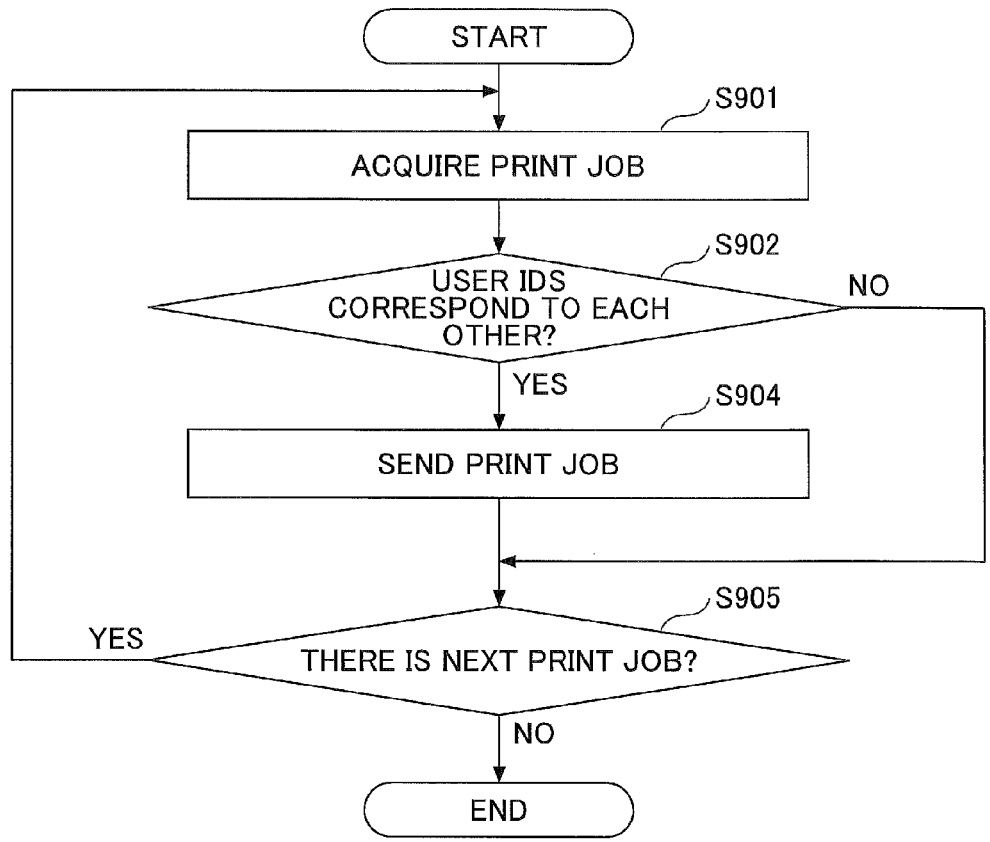
FIG. 19 is a flowchart illustrating an example of a print job acquisition process according to the third embodiment.

Next, the process of acquiring a print job at step S1804 in the above-described print process will be explained using FIG. 19. FIG. 19 is a flowchart illustrating an example of the print job acquisition process according to the third embodiment.

In the print job acquisition process according to the present embodiment, different from the first embodiment, the process at step S903 is not performed. Therefore, in the print job acquisition process according to the present embodiment, the print server 20 sends all print jobs, each including the user ID received from the image forming apparatus 30, to the image forming apparatus 30.

As stated above, in the present embodiment, a print job of user ID corresponding to first identification information which is preliminarily registered by the mobile terminal 10 can be printed at the image forming apparatus 30. Therefore, according to the present embodiment, even if spoofing is performed by others disguising the user ID, illegal execution of a print job by the others can be prevented.

Fourth Embodiment

Next, a print system 1 according to a fourth embodiment will be explained. The print system 1 according to the fourth embodiment is different from the third embodiment in that it is possible to perform synchronization for the identification information among plural mobile terminals 10. In the following, for a component having substantially the same function as the third embodiment and performing the same process, the same reference numeral as in the first embodiment will be used and an explanation thereof will be omitted.

<System Configuration>

Figure 20:
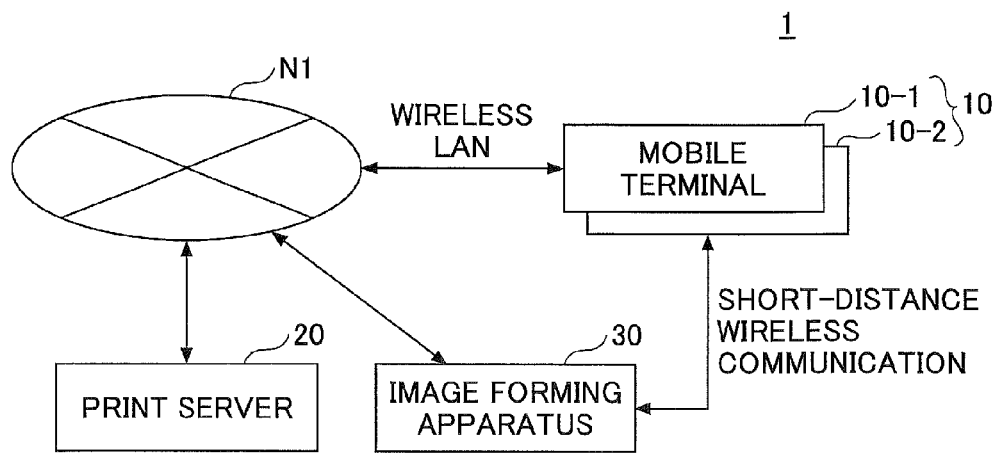
FIG. 20 is a diagram illustrating an example of a configuration of a print system according to a fourth embodiment.

A system configuration of the print system 1 according to the present embodiment will be explained using FIG. 20. FIG. 20 is a diagram illustrating an example of a configuration of the print system according to the fourth embodiment. The print system 1, shown in FIG. 20, includes plural mobile terminals 10. In the following, the print system 1 according to the present embodiment is assumed to have a mobile terminal 10-1 and a mobile terminal 10-2.

The mobile terminal 10-1, is a terminal device such as a smartphone or a tablet type terminal, in the same way as in the first embodiment. On the other hand, the mobile terminal 10-2 is a wearable type terminal device referred to as a wearable terminal, a wearable device, a wearable computer or the like. That is, the mobile terminal 10-2 is one of various kinds of wearable type terminal devices such as a wristwatch type, a glasses type or a finger ring type.

In the print system 1 according to the present embodiment, which will be explained in the following, it is assumed that identification information of the mobile terminal 10-1 is synchronized with the mobile terminal 10-2 and the user performs printing at the image forming apparatus 30 by using the mobile terminal 10-2. Thus, the user can easily perform printing by using a relatively small mobile terminal 10-2, which the user wears.

<Software Configuration>

Figure 21:
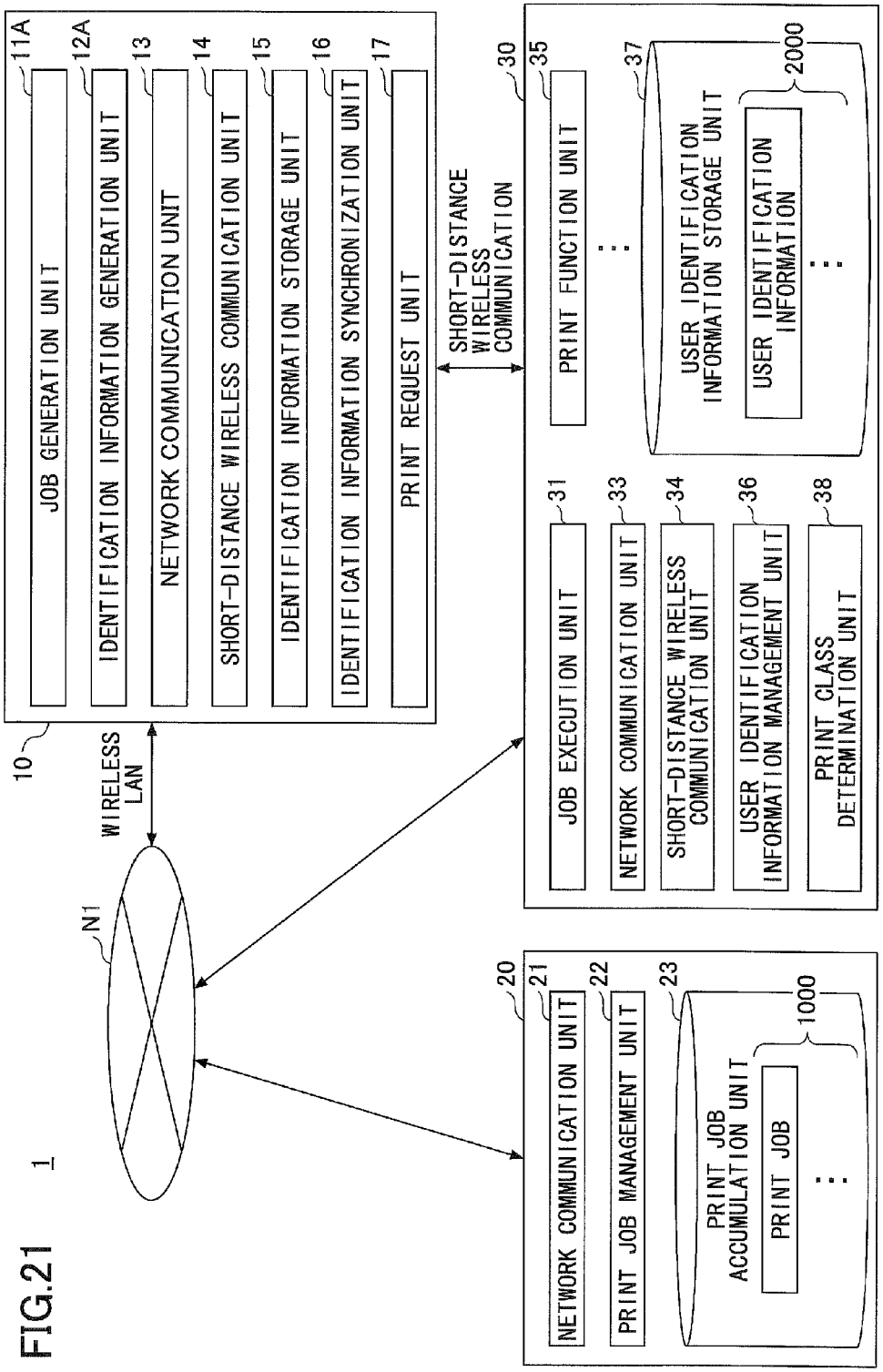
FIG. 21 is a functional block diagram illustrating an example of the print system according to the fourth embodiment.

The print system 1 according to the present embodiment can be expressed by functional blocks as shown in FIG. 21, for example. FIG. 21 is a functional block diagram illustrating an example of a print system according to the fourth embodiment. Meanwhile, a functional block of the print server 20 is the same as that in the third embodiment.

<<Mobile Terminal>>

The mobile terminal 10 according to the present embodiment includes an identification information synchronization unit 16 and a print request unit 17. The identification information synchronization unit 16 sends first identification information stored in the identification information storage unit 15 to other mobile terminal 10, and synchronizes the first identification information with the other mobile terminal 10. For example, the mobile terminal 10-1 sends first identification information to the mobile terminal 10-2 by the short-distance wireless communication unit 14, and stores the first identification information in the identification information storage unit 15 of the mobile terminal 10-2. Thus, the identification information is synchronized between the mobile terminal 10-1 and the mobile terminal 10-2.

The print request unit 17 sends a print request including the first identification information and a print class to the image forming apparatus 30 by the short-distance wireless communication unit 14. Here, the print class is information indicating printing all print jobs, which can be printed according to first identification information included in the print request (overall printing) or printing a print job selected by the user (selected printing).

In a case where the print class is "overall printing", at the image forming apparatus 30, all print jobs of user ID corresponding to first identification information included in the print request are executed. On the other hand, in a case where the print class is "selected printing", in the same way as the explanation in the first embodiment or the like, at the image forming apparatus 30, a print job selected in the print job selection screen is executed.

<<Image Forming Apparatus>>

The image forming apparatus 30 according to the present embodiment, includes a print class determination unit 38. The print class determination unit 38 determines whether a print class included in the print request received from the mobile terminal 10 is the "overall printing" or the "selected printing", and controls the image forming apparatus 30 in response to a determination result.

<Details of Processes>

Next, a process of the print system 1 according to the fourth embodiment will be explained in detail.

<<Print Process>>

Figure 22:
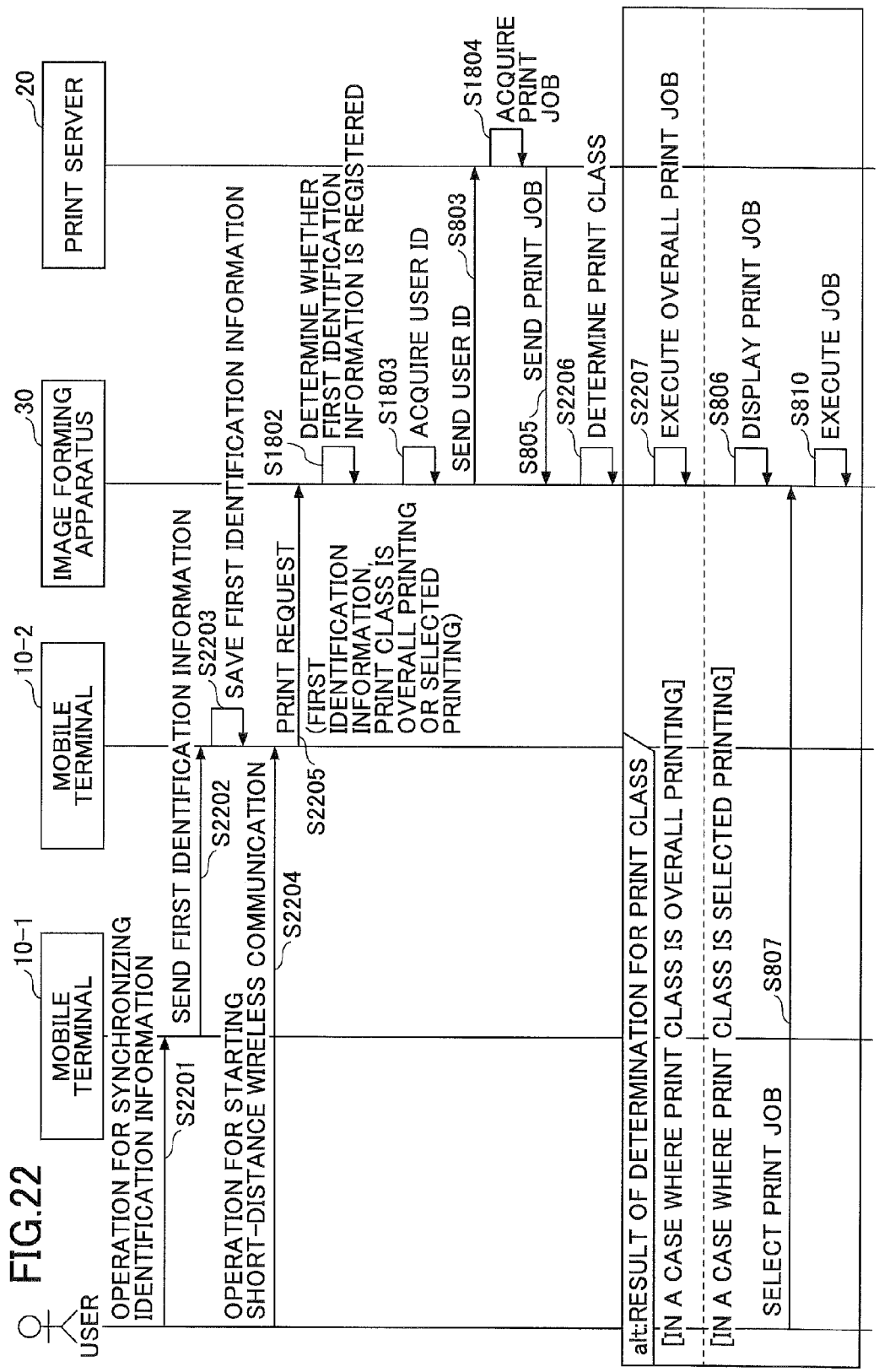
FIG. 22 is a sequence diagram illustrating an example of a print process according to the fourth embodiment.

A print process according to the present embodiment will be explained using FIG. 22. FIG. 22 is a sequence diagram illustrating an example of the print process according to the fourth embodiment. The print process according to the present embodiment, as described above, is to perform printing by the user at the image forming apparatus 30 using the mobile terminal 10-2 after synchronizing the first identification information of the mobile terminal 10-1 with the mobile terminal 10-2.

The user operates the mobile terminal 10-1 to perform a synchronization operation for synchronizing the first identification information of the mobile terminal 10-1 with the mobile terminal 10-2 (step S2201).

The identification information synchronization unit 16 of the mobile terminal 10-1 sends the first identification information stored in the identification information storage unit 15 to the mobile terminal 10-2 via the short-distance wireless-communication unit 14, and requests synchronization of the identification information (step S2202). Meanwhile, it is assumed that the mobile terminal 10-1 and the mobile terminal 10-2 are preliminarily paired according to communication standard such as Bluetooth.

The identification information synchronization unit 16 of the mobile terminal 10-2, upon receiving the first identification information from the mobile terminal 10-1, stores the received first identification information in the identification information storage unit 15 (step S2203). Thereby, the identification information of the mobile terminal 10-1 is synchronized between the mobile terminal 10-1 and the mobile terminal 10-2. Meanwhile, the processes at steps S2201 to S2203 are preliminarily performed by the user before performing the process at step S2204, which will be explained later.

The user performs an operation of starting the short-distance wireless communication using the mobile terminal 10-2 (step S2204). That is, the user, for example, performs an operation of holding the mobile terminal 10-2 over a predetermined position of the image forming apparatus 30 to which an NFC chip or the like is adhered.

The print request unit 17 of the mobile terminal 10-2 sends a print request including the first identification information and a print class to the image forming apparatus 30 by the short-distance wireless communication unit 14 (step S2205).

Here, for the print class included in the print request, it only has to set the "overall printing" or the "selected printing" in response to setting information or the like for the mobile terminal 10-2. For example, the print class may be preliminarily set by the user to either the "overall printing" or the "selected printing". Moreover, for example, the print class may be set by the print request unit 17 to either the "overall printing" or the "selected printing" according to information such as a screen size of the mobile terminal 10-2 or a model name.

The print class determination unit 38 of the image forming apparatus 30 determines whether the print class included in the print request received from the mobile terminal 10-2 is the "overall printing" or the "selected printing" (step S2206). Then, in a case where it is determined that the print class is the "overall printing", the image forming apparatus 30 executes a process at step S2207. On the other hand, in a case where it is determined that the print class is the "selected printing", the image forming apparatus 30 executes a process at step S806.

Meanwhile, at step S2205, the print request unit 17 of the mobile terminal 10-2 may send a print request including the information such as a screen size of the mobile terminal 10-2 or a model name to the image forming apparatus instead of the print class. In this case, at step S2206, the print class determination unit 38 of the image forming apparatus 30 only has to determine whether it should be the "overall printing" or the "selected printing", based on the information such as a screen size or a model name included in the print request. In this way, the print class may be determined at the image forming apparatus 30, based on the information such as a screen size of the mobile terminal 10-2 or a model name.

The job execution unit 31 of the image forming apparatus 30 executes all the print jobs received from the print server 20 (step S2207).

In this way, in the print system 1 according to the present embodiment, in the case where the print class included in the print request sent from the mobile terminal 10-2 is the "overall printing", the image forming apparatus 30 executes all the print jobs received from the print server 20, and prints. Thus, the user need not select the print job to be executed from the print job selection screen displayed on the operation panel 302 if the image forming apparatus 30. Therefore, in the print system according to the present embodiment, the user can easily perform printing only by holding the mobile terminal 10-2 over the image forming apparatus 30.

Meanwhile, in the case where the print class included in the print request is determined to be the "selected printing" at step S2206, as above, a print job selection screen is displayed on the operation panel 302 of the image forming apparatus 30, in the same way as in the first embodiment. Then, the print job selected by the user on the print job selection screen is executed at the image forming apparatus 30 and printed.

Fifth Embodiment

Next, a print system 1 according to a fifth embodiment will be explained. In the print system 1 according to the fifth embodiment, it is determined at the print server 20 whether a print job includes identification information and whether identification information sets correspond to each other. Then, the print system 1 according to the fifth embodiment is different from the second and fourth embodiments in that the print job in response to a result of determination can be executed using the mobile terminal 10-2. In the following, for a component having substantially the same function as the second and fourth embodiments and performing the same process, the same reference numeral as in the second and fourth embodiments will be used and an explanation thereof will be omitted. Meanwhile, a system configuration is the same as in the fourth embodiment.

<Software Configuration>

Figure 23:
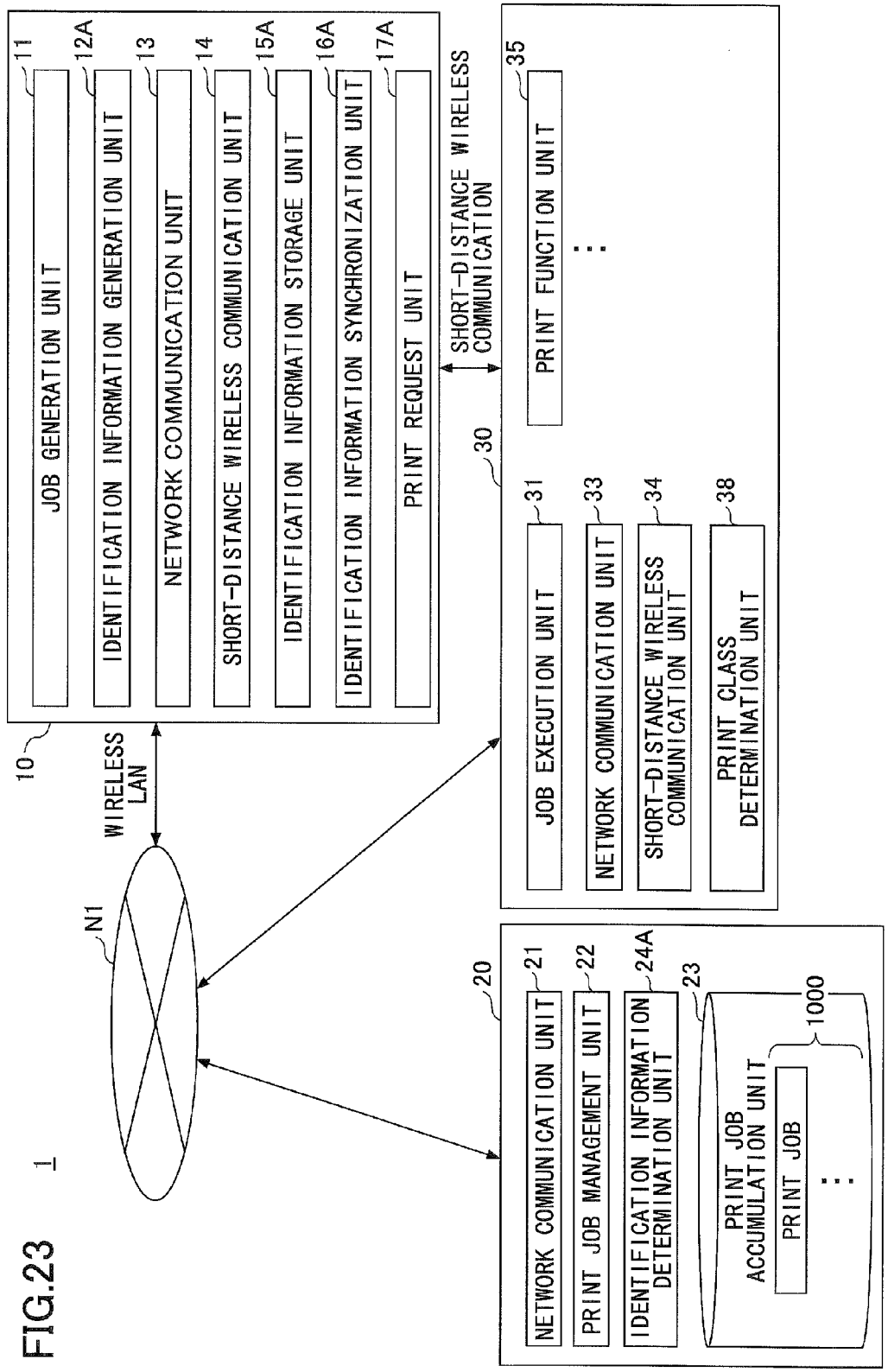
FIG. 23 is a functional block diagram illustrating an example of a print system according to a fifth embodiment.

The print system 1 according to the present embodiment can be expressed by functional blocks as shown in FIG. 23, for example. FIG. 23 is a functional block diagram illustrating an example of a print system according to the fifth embodiment.

<<Mobile Terminal>>

The mobile terminal 10 according to the present embodiment includes an identification information synchronization unit 16A and a print request unit 17A. The identification information synchronization unit 16A sends first identification information stored in the identification information storage unit 15 and user ID to other mobile terminal 10, and synchronizes the first identification information and the user ID with the other mobile terminal 10. For example, the mobile terminal 10-1 sends first identification information and user ID to the mobile terminal 10-2 by the short-distance wireless communication unit 14, and stores the first identification information and the user ID in the identification information storage unit 15A of the mobile terminal 10-2. Thus, the identification information and the user ID are synchronized between the mobile terminal 10-1 and the mobile terminal 10-2.

The print request unit 17A, furthermore, sends a request to execute the print job selected by the user to the image forming apparatus 30.

<<Print Server>>

The print server 20 includes an identification information determination unit 24A. The identification information determination unit 24A further determines whether the print job includes second identification information.

Meanwhile, in the same way as in the second embodiment, the mobile terminal 10 generates a print job including second identification information by the job generation unit 11. Therefore, in the print job accumulation unit 23 of the print server 20 according to the present embodiment, not only a print job including first identification information but also a print job including second identification information can be accumulated.

<Details of Process>

Next, the process of the print system 1 according to the fifth embodiment will be explained in detail. Meanwhile, since a print job accumulation process according to the fifth embodiment is the same as the print job accumulation process according to the second embodiment, an explanation will be omitted.

<<Print Process>>

Figure 24:
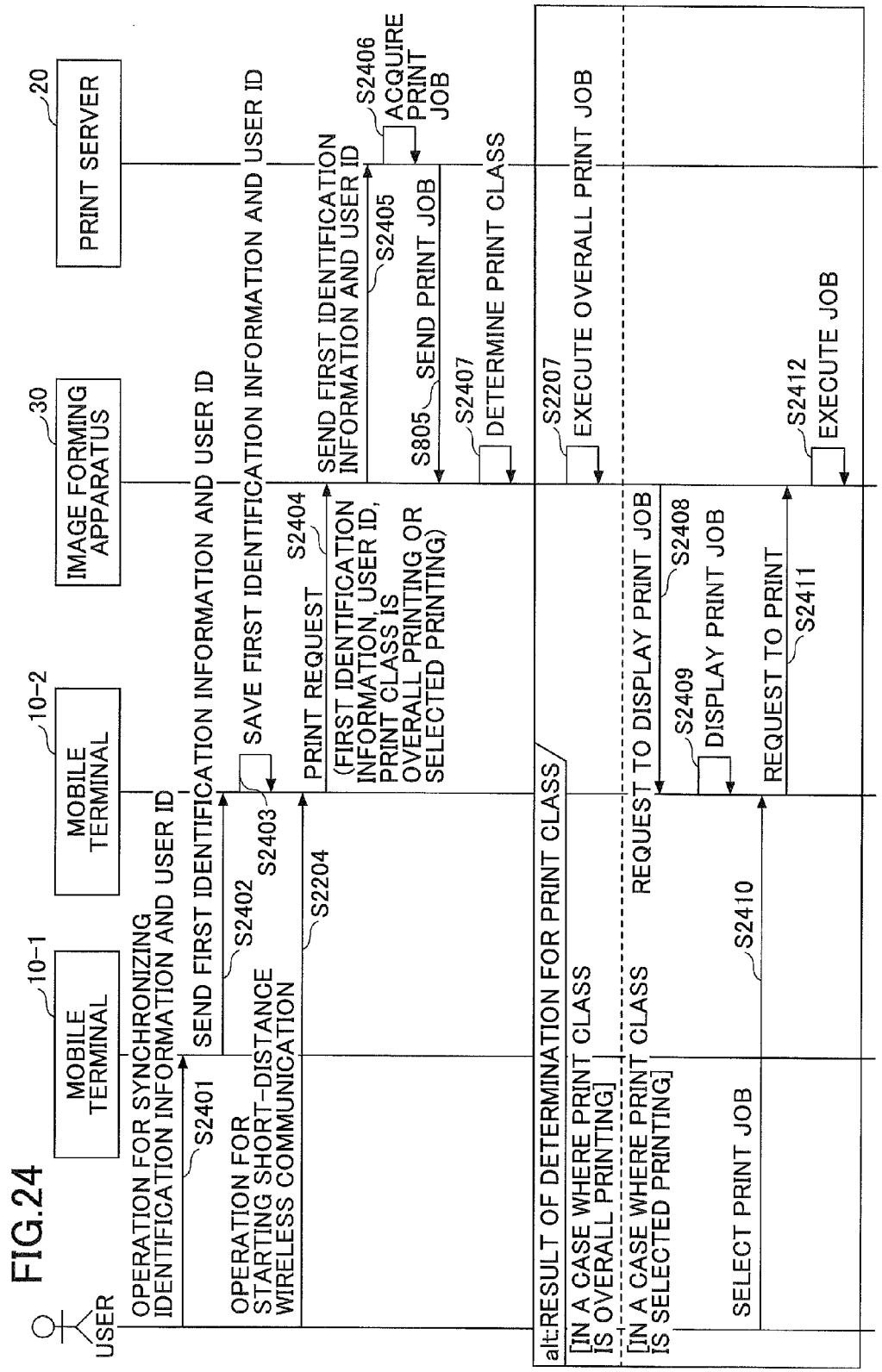
FIG. 24 is a sequence diagram illustrating an example of a print process according to the fifth embodiment.

The print process according to the fifth embodiment will be explained using FIG. 24. FIG. 24 is a sequence diagram illustrating an example of the print process according to the fifth embodiment.

The user operates the mobile terminal 10-1 to perform an synchronization operation to synchronize first identification information and user ID of the mobile terminal 10-1 with the mobile terminal 10-2 (step S2401).

The identification information synchronization unit 16A of the mobile terminal 10-1 sends the first identification information and the user ID stored in the identification information storage unit 15A to the mobile terminal 10-2 via the short-distance wireless communication unit 14, and requires synchronization of the first identification information and the user ID (step S2402). Meanwhile, in the same way as in the fourth embodiment, the mobile terminal 10-1 and the mobile terminal 10-2 are assumed to be preliminarily paired according to communication standard such as Bluetooth.

The identification information synchronization unit 16A of the mobile terminal 10-2, upon receiving the first identification information and the user ID from the mobile terminal 10-1, stores the received first identification information and the user ID in the identification information storage unit 15A (step S2403). Thus, the identification information and the user ID of the mobile terminal 10-1 are synchronized between the mobile terminal 10-1 and the mobile terminal 10-2. Meanwhile, the processes at steps S2401 to S2403 are preliminarily performed by the user before performing the process at step S2204.

The print request unit 17A of the mobile terminal 10-2 sends a print request including the first identification information, the user ID and a print class to the image forming apparatus 30 by the short-distance wireless communication unit 14 (step S2404). Meanwhile, for the print class included in the print request, in the same way as in the fourth embodiment, it only has to set the "overall printing" or the "selected printing" in response to setting information or the like for the mobile terminal 10-2.

The network communication unit 33 of the image forming apparatus 30 sends the user ID received from the mobile terminal 10-2 and the first identification information to the print server 20, and requires to acquire a print job based on the user ID and the first identification information (step S2405).

The print job management unit 22 of the print server 20, upon receiving the user ID and the first identification information from the image forming apparatus 30, performs a print job acquisition process (step S2406). The print job acquisition process according to the present embodiment will be described later.

Here, in the print process according to the fifth embodiment, in the print job acquisition process which will be described later, a print job including second identification information corresponding to the first identification information and a print job which does not include second identification information are acquired.

The print class determination unit 38 of the image forming apparatus 30 determines whether the print class included in the print request received from the mobile terminal 10-2 is the "overall printing" or the "selected printing" (step S2407). Then, in a case where it is determined that the print class is the "overall printing", the image forming apparatus 30 executes a process at step S2207. On the other hand, in a case where it is determined that the print class is the "selected printing", the image forming apparatus 30 executes a process at step S2408.

The short-distance wireless communication unit 34 of the image forming apparatus 30 sends a display request including the print job acquired from the print server 20 to the mobile terminal 10-2 (step S2408). Meanwhile, the image forming apparatus 30 may send a display request including the job ID of the print job acquired from the print server 20, a job name or the like to the mobile terminal 10-2.

The mobile terminal 10-2 displays a print job selection screen, which is a list screen for the user to select a print job, on the display device 102 (step S2409).

The user selects a desired print job from the print job selection screen displayed on the display device 102 of the mobile terminal 10-2 (step S2410).

The print request unit 17A of the mobile terminal 10-2 sends the print request including job ID of the print job selected by the user to the image forming apparatus 30 by the short-distance wireless communication unit 14 (step S2411).

The job execution unit 31 of the image forming apparatus 30 executes a print job of the job ID included in the received print request, and the print function unit 35 prints print target data included in the print job (step S2412).

As stated above, in the image forming apparatus 30, the print target data included in the print job selected by the user are printed. Furthermore, in the present embodiment, in the case where the print class is the "selected printing", a selection screen for a print job is displayed on the display device 102 of the mobile terminal 10-2. Thus, the user can select a print job desired to be printed using the mobile terminal 10-2.

That is, in the print system 1 according to the present embodiment, for example, for a mobile terminal 10-2, in which a display device 102 is small or which does not have a display device 102 itself (for example, a finger-ring type wearable terminal) or the like, the print class is "overall printing", and all print jobs acquired from the print server 20 are executed. On the other hand, in a mobile terminal 10-2 having a display device 102, which the user can operate (for example, a wristwatch-type wearable terminal) or the like, the print class is "selected printing", and the user can select a print job to be executed from a print job selection screen.

<<Print Job Acquisition Process>>

Figure 25:
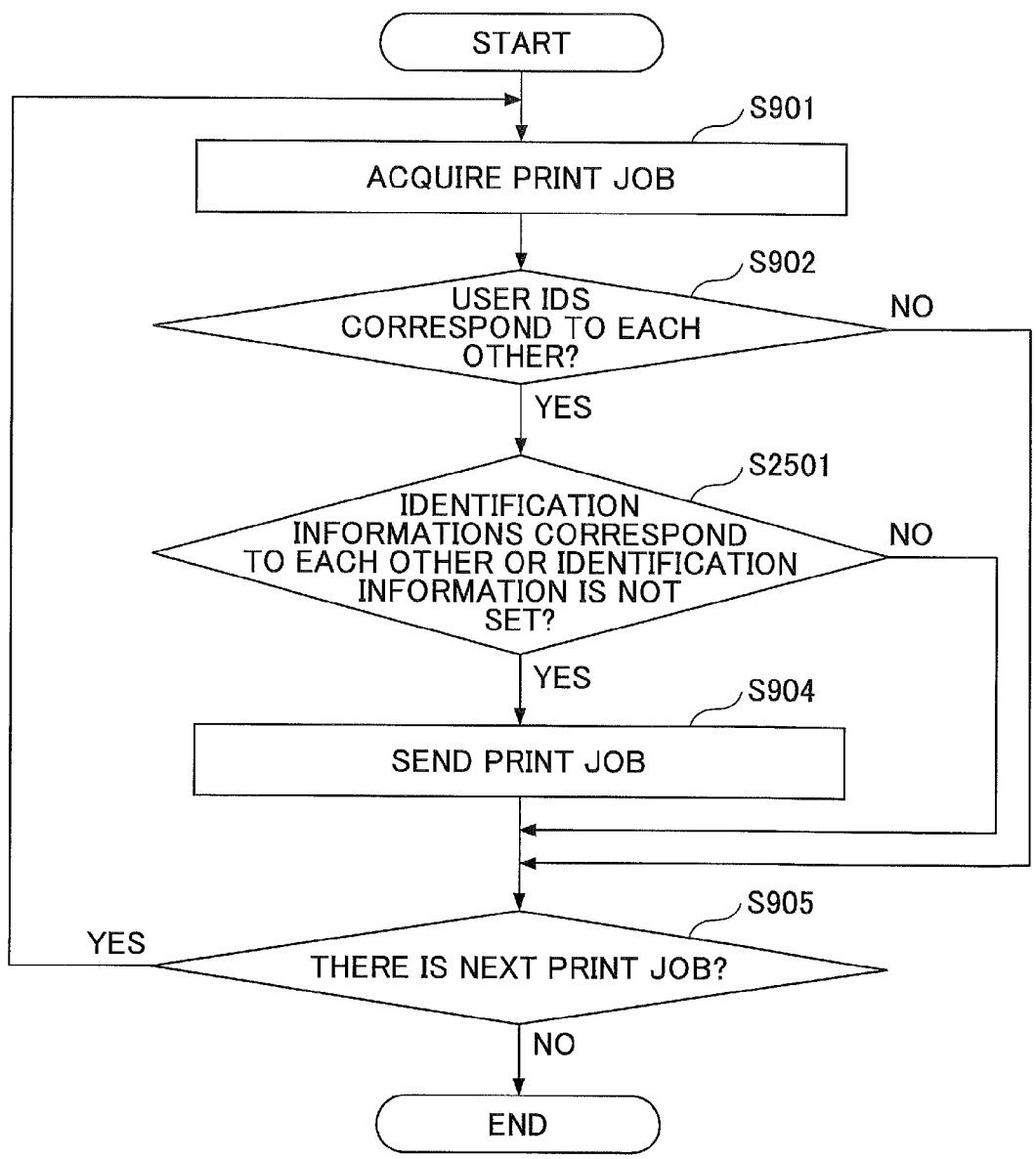
FIG. 25 is flowchart illustrating an example of a print job acquisition process according to the fifth embodiment.

Next, the print job acquisition process at step S2406 in the above-described print process will be explained using FIG. 25. FIG. 25 is a flowchart illustrating an example of the print job acquisition process according to the fifth embodiment.

The identification information determination unit 24A of the print server 20 determines whether the print job acquired at step S901 includes second identification information, and whether, in a case where second identification information is included, it corresponds to the first identification information (step S2501). The print server 20, in a case where a determination result by the identification information determination unit 24A shows that the second identification information included in the print job does not correspond to the first identification information, proceeds to step S905.

On the other hand, the print server 20, in a case where the determination result by the identification information determination unit 24A shows that the second identification information included in the print job corresponds to the first identification information or in a case where it shows that the print job does not include second identification information, proceeds step S904.

In this way, in the print system 1 according to the present embodiment, in the print server 20, a print job including second identification information corresponding to the first identification information and a print job not including second identification information are acquired. Thus, in the present embodiment, in the above-described print process, the user can execute a print job including the own user ID by using the mobile terminal 10-2.

Further, the present invention is not limited to these embodiments, but various variations and modifications may be made without departing from the scope of the present invention.

The present application is based on and claims the benefit of priority of Japanese Priority Applications No. 2014-180812 filed on Sep. 5, 2014 and No. 2015-147466 filed on Jul. 27, 2015, with the Japanese Patent Office, the overall contents of which are hereby incorporated by reference.

What is claimed is:

1. An information processing apparatus comprising:
memory storing computer-readable instructions; and
one or more processors configured to execute the computer-readable instructions such that the one or more processors are configured to,
   receive one or more jobs from a first terminal device,
   accumulate the one or more jobs,
   acquire,
      first user information that identifies a user who logs in on the first terminal device, and
      first identification information that identifies the first terminal device,
   determine whether the first identification information corresponds to second identification information, the second information being included in a first job received and accumulated by the information processing apparatus, the second information identifying a terminal device that sent the first job to the information processing apparatus, the first job being a job that includes second user information that corresponds to the first user information, and
   execute the first job to perform a process in a case where a result of the determining indicates that the first identification information corresponds to the second identification information.

2. The information processing apparatus as claimed in claim 1, wherein the one or more processors are configured to execute the computer-readable instructions such that the one or more processors are configured to acquire the first user information and the first identification information via a short-distance wireless connection between the first terminal device and the information processing apparatus.

3. The information processing apparatus as claimed in claim 2, wherein the short-distance wireless connection is a Bluetooth connection or a near filed communication (NFC) connection.

4. The information processing apparatus as claimed in claim 1, wherein the first identification information and the second identification information are any one of a physical address, a product serial number and information for uniquely identifying a terminal device generated by a predetermined algorithm, or a combination thereof.

5. The information processing apparatus as claimed in claim 1, wherein the one or more processors are configured to execute the computer-readable instructions such that the one or more processors are configured to,
display a selection screen for the user to select whether to execute the first job including the user information, in a case where a result of the determining indicates that the first identification information does not correspond to the second identification information, and
execute the first job to perform the process, in a case where the user selects to execute the job in the selection screen.

6. The information processing apparatus as claimed in claim 1, wherein the one or more processors are configured to execute the computer-readable instructions such that the one or more processors are configured to,
cause the first terminal device to display a list screen showing the first job and a second job that does not include the second identification information, and
execute a job selected by the user from among the first job and the second job shown in the list screen to perform the process.

7. The information processing apparatus as claimed in claim 6, wherein the one or more processors are configured to execute the computer-readable instructions such that the one or more processors are configured to,
acquires a print class indicating whether to execute all jobs that include user information corresponding to the first user information, and
in a case where the print class indicates executing all the jobs that include user information corresponding to the first user information, execute the first job and the second job to perform the process without displaying the list screen.

8. The information processing apparatus as claimed in claim 1,
wherein jobs accumulated in the information processing apparatus include a job which does not include the second identification information, and
wherein the one or more processors are configured to execute the computer-readable instructions such that the one or more processors are configured to,
inhibit execution of the first job, in a case where the result of the determining indicates that the first identification information does not correspond to the second identification information, and
execute the first job to perform the predetermined process, in a case where the result of the determining indicates that the first identification information does correspond to the second identification information.

9. An information processing system including the information processing apparatus as claimed in claim 1 and an image processing apparatus configured to perform an image process in accordance with the first job.

10. An image processing apparatus comprising:
memory storing computer-readable instructions; and
one or more processors configured to execute the computer-readable instructions such that the one or more processors are configured to,
receive one or more jobs from a first terminal device,
accumulate the one or more jobs,
acquire,
first user information that identifies a user who logs in on the first terminal device, and
first identification information that identifies the first terminal device,
determine whether the first identification information corresponds to second identification information, the second information being included in a first job received and accumulated by the information processing apparatus, the second information identifying a terminal device that sent the first job to the information processing apparatus, the first job being a job that includes second user information that corresponds to the first user information, and
execute the first job to perform a process in a case where a result of the determining indicates that the first identification information corresponds to the second identification information.

11. The image processing apparatus as claimed in claim 10, wherein the one or more processors are configured to execute the computer-readable instructions such that the one or more processors are configured to acquire the first user information and the first identification information via a short-distance wireless connection between the first terminal device and the information processing apparatus.

12. The image processing apparatus as claimed in claim 11, wherein the short-distance wireless connection is a Bluetooth connection or a near filed communication (NFC) connection.

13. An information processing method in an information processing apparatus, the method comprising:
receiving one or more jobs from a first terminal device,
accumulating the one or more jobs,
acquiring,
first user information that identifies a user who logs in on the first terminal device, and
first identification information that identifies the first terminal device,
determining whether the first identification information corresponds to second identification information, the second information being included in a first job received and accumulated by the information processing apparatus, the second information identifying a terminal device that sent the first job to the information processing apparatus, the first job being a job that includes second user information that corresponds to the first user information, and
executing the first job to perform a process in a case where a result of the determining indicates that the first identification information corresponds to the second identification information.

14. The information processing method as claimed in claim 13, wherein the acquiring includes acquiring the first user information and the first identification information via a short-distance wireless connection between the first terminal device and the information processing apparatus.

15. The information processing method as claimed in claim 14, wherein the short-distance wireless connection is a Bluetooth connection or a near filed communication (NFC) connection.

\* \* \* \* \*